United States Patent [19]
Breed et al.

[11] Patent Number: 5,441,301
[45] Date of Patent: Aug. 15, 1995

[54] CRUSH SENSING VEHICLE CRASH SENSOR

[75] Inventors: David S. Breed, Boonton Township; Scott D. Phillips; W. Thomas Sanders, both of Rockaway; Richard Downs, Jr., Newton, all of N.J.

[73] Assignee: Automotive Technologies International, Inc., Boonton Twp., N.J.

[21] Appl. No.: 24,076

[22] Filed: Mar. 1, 1993

Related U.S. Application Data

[63] Continuation-in-part of Ser. No. 795,035, Nov. 20, 1991, Pat. No. 5,326,133, and Ser. No. 727,756, Jul. 9, 1991, abandoned.

[51] Int. Cl.⁶ .................... H01H 15/04; B60R 21/16
[52] U.S. Cl. .................... 280/735; 180/274; 200/61.44; 200/86 R
[58] Field of Search ............ 180/274; 280/735; 200/86 R, 61.72, 61.73, 61.43, 61.44

[56] References Cited

U.S. PATENT DOCUMENTS

| | | | |
|---|---|---|---|
| 3,495,675 | 2/1970 | Hass et al. | 180/274 |
| 3,509,360 | 4/1970 | Miller | 200/86 R |
| 3,654,412 | 4/1972 | Haruna et al. | 180/274 |
| 3,754,176 | 8/1973 | Miller | 200/61.43 |
| 3,853,199 | 12/1974 | Hirashima et al. | 200/61.44 |
| 4,046,975 | 9/1977 | Seeger, Jr. | 200/86 R |
| 4,060,705 | 11/1977 | Peachey | 200/86 R |
| 4,762,970 | 8/1988 | Brinsley | 200/86 R |
| 4,988,862 | 1/1991 | Beltz | 280/735 |
| 4,995,639 | 2/1991 | Breed | 280/735 |
| 5,005,861 | 4/1991 | Breed et al. | 280/734 |

FOREIGN PATENT DOCUMENTS

| | | | |
|---|---|---|---|
| 207630 | 8/1939 | Switzerland | 180/274 |
| 2225660 | 6/1990 | United Kingdom | 280/735 |

*Primary Examiner*—Karin L. Tyson
*Attorney, Agent, or Firm*—Samuel Shipkovitz

[57] ABSTRACT

A vehicle crush detecting device consists of an electrically conducting tube with an electrically conducting rod concentrically positioned within the tube along with insulating means positioned at at least two points between the rod and the tube to insulate the rod from the tube. The electrically conducting tube is deformed during a vehicle crash by a force greater than a predetermined magnitude which causes the tube to contact the rod in response to the crush of a vehicle of a predetermined amount. The crush sensor is mounted in the crush zone of the vehicle and is used in conjunction with automobile passive restraint systems such as airbags.

9 Claims, 18 Drawing Sheets

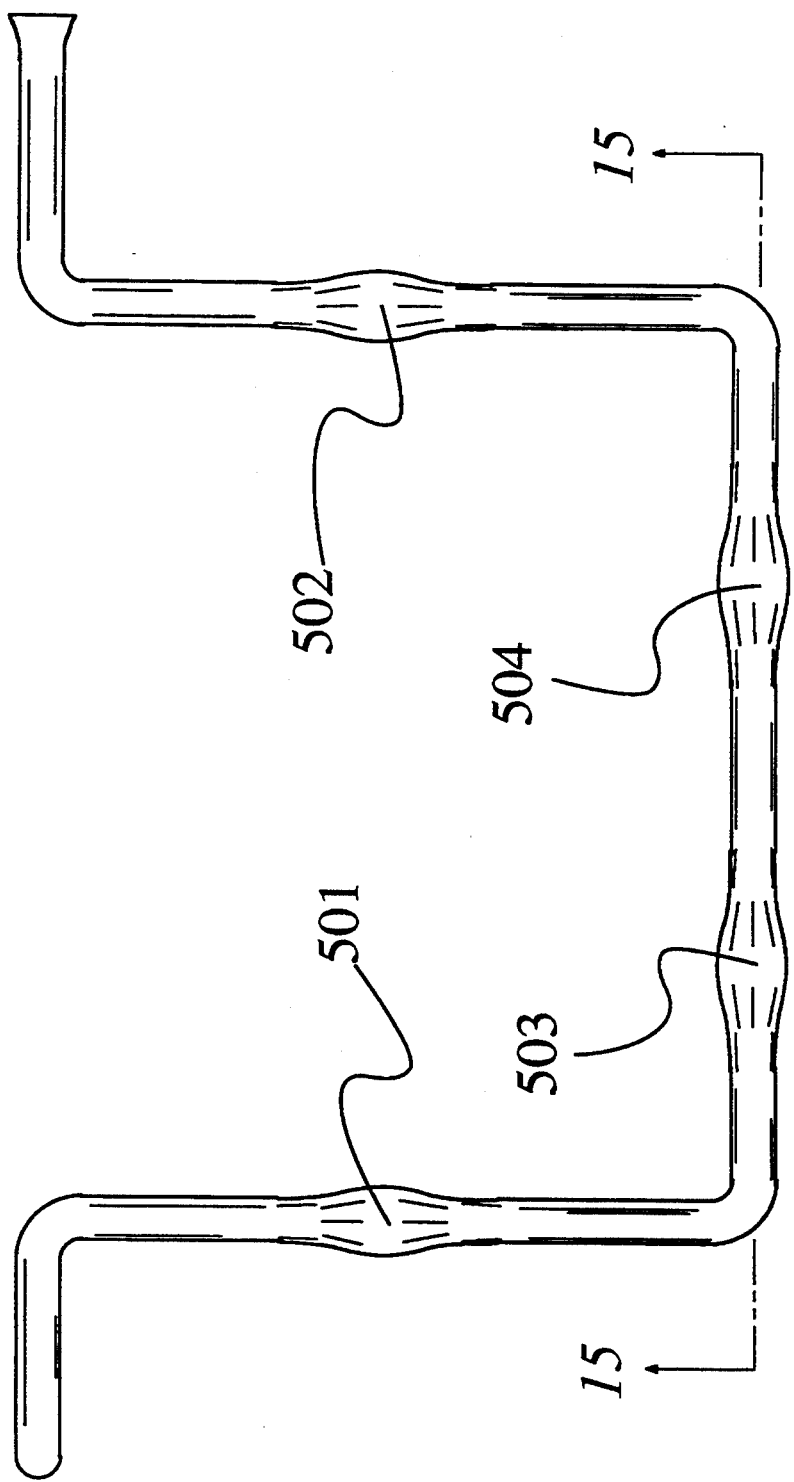
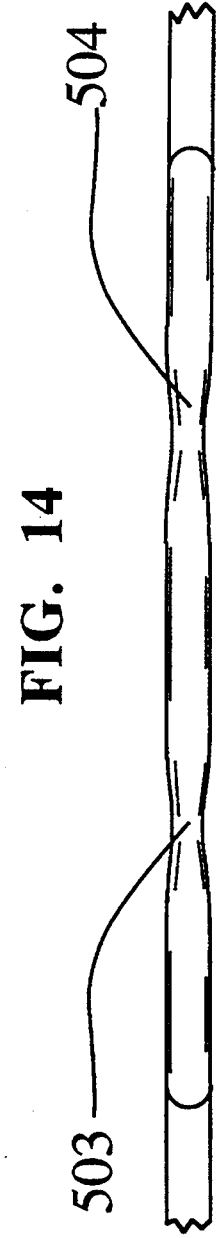
FIG. 14
FIG. 15

CRUSH SENSING VEHICLE CRASH SENSOR

CROSS REFERENCE

This invention is a continuation-in-part of U.S. patent application Ser. No. 07/795,035, filed Nov. 20, 1991, now U.S. Pat. No. 5,326,133, and of U.S. patent application Ser. No. 07/727,756, filed Jul. 9, 1991, now abandoned.

BACKGROUND OF THE INVENTION

In Society of Automotive Engineers (SAE) paper 930650, "A Complete Frontal Crash Sensor System—I", by Breed et al, which is included herein by reference, the authors conclude that airbag crash sensors mounted in the crush zone are necessary for the proper sensing of airbag required crashes. They also conclude that such sensors should sense crashes to all portions of the front of the vehicle and that sensors which sense the crush of the vehicle are preferred. The theory of crush sensing is presented in the co-pending U.S. patent applications cross referenced above and in SAE paper No. 920122, "Performance of a Crush Sensor for Use with Automotive Airbag Systems", by Breed et al, which are both included herein by reference.

The tape switch crush sensor described in the above referenced co-pending patent application, has performed successfully on various staged vehicle crashes into barriers and poles. These sensors are line sensors and will sense any crash which results in a deformation in the area where the sensor is mounted. Research has determined that at least three such sensors are required to sense all crashes involving the front of the vehicle inside of the rail structures. Additional sensors are required if crashes outside the rails are to be sensed in time. Although these sensors perform better than the standard ball-in-tube or spring mass sensors, it would be better yet if a single sensor could sense all airbag desired crashes involving the front of the vehicle.

Other SAE papers which provide pertinent background information to this invention include:

1. Breed, D. S., Sanders, W. T. and Castelli, V. "A Critique of Single Point Crash Sensing", Society of Automotive Engineers No. 920124, 1992.
2. Breed, D. S., Castelli, V. and Shokoohi, F. "Are Barrier Crashes Sufficient for Evaluating Air Bag Sensor Performance?", Society of Automotive Engineers No. 900548, 1990.
3. Shokoohi, F., Sanders, W. T., Castelli, V., and Breed, D. S. "Cross Axis Specifications For Crash Sensors", Automotive Technologies International Report, ATI 12004, 1991. Society of Automotive Engineers No. 930651, 1993.
4. Breed, D. S., Castelli, V. "Problems in Design and Engineering of Air Bag Systems", Society of Automotive Engineers No. 880724, 1988.
5. Breed, D. S., Castelli, V. "Trends in Sensing Frontal Impacts", Society of Automotive Engineers No. 890750, 1989.

Other relevant prior art includes U.S. Pat. No. 3,859,482 to Matsui. Matsui discloses various devices which respond to the pressure which accompanies a vehicle crash when material crushed in the extreme front of the vehicle impacts the pressure detecting device. His devices discriminate crashes based on the magnitude of this pressure on the detecting device. His devices are placed far forward in the vehicle where they are in the front of the crush zone at the time that sensor triggering is required.

The devices disclosed in this invention, on the other hand, are usually mounted at the extreme rear of the crush zone at the time that the sensor is required to trigger and respond to the amount of crush of the vehicle as taught in U.S. Pat. No. 4,995,639 to Breed. Thus, it is mainly the distance that the crush zone had propagated into the vehicle that is sensed rather than the amount of force on the sensor as in Matsui. Devices disclosed in Matsui are very poor at discriminating airbag desired crashes from those where an airbag is not required since a localized force is sufficient to trigger the sensor. As taught in the above references, a crush sensing sensor must be located at the boundary of the crush zone at the time that deployment is required. In addition to the location of the sensor, there are many structural differences between the devices disclosed in Matsui and here.

SUMMARY OF THE INVENTION

The crush sensing crash sensor of this invention is adapted for installation in the crush zone of an automobile equipped with a passenger protective device such as an inflatable airbag or seat belt tensioner. (Hereinafter the word airbag will be used to mean all deployable passive passenger protective devices including airbags, seatbelts with tensioners and deployable nets.) An engine compartment is conventionally defined as the entire portion of the vehicle from the back of the cosmetic grill to the front of the firewall, under the hood and between the fenders. When the vehicle is subjected to a crash of sufficient magnitude as to require the deployment of the passive protective device, a portion of the front of the vehicle is crushed rearward until it contacts the sensor. At least a portion of the sensor deforms by bending or crushing due to the forces exerted on it by the material contacting it. In a preferred embodiment, the sensor is constructed from a long rod and a tube with the rod position in the center of the tube by means of insulating spacers. When the tube bends or crushes, it contacts the rod completing the circuit and initiating deployment of the airbag. The rod and tube assembly can be formed in any convenient geometry, as discussed below, during manufacture so as to conform to the crush zone boundary of the vehicle. In this manner the sensor is placed in the proper position to catch all crashes to the front of the vehicle regardless of where on the vehicle the impact takes place.

The principle objects and advantages of this invention are:

1) To provide a single sensor which will sense all airbag desired crashes involving the front of the vehicle.
2) To provide a sensor which is much longer than it is wide or thick thus permitting it to sense crashes over a large area while occupying a small space.
3) To provide a sensor which can be easily shaped so to be properly placed relative to the crush zone boundary across the entire front of the vehicle.
4) To provide a sensor which will sense a low pole impact which engages the vehicle below the bumper.
5) To provide a sensor which will sense an impact to the vehicle outside of the vehicle supporting structure, such as the rails.

6) To provide a crush sensor where the deformation required to trigger the sensor can be varied along the length of the sensor.

7) To provide a sensor to be used along with an electronic passenger compartment sensor which will trigger on all of the airbag desired crashes which are missed by the electronic passenger compartment mounted sensor.

8) To provide the simplest sensor system consisting of a single discriminating sensor mounted in the crush zone and a single arming sensor mounted in the passenger compartment.

9) To provide a crush zone mounted sensor which will not cause the airbag to deploy on low velocity change impacts into animals.

10) To provide a crush sensor which is not easily damaged during routine maintenance or normal environmental influences during the life of the vehicle.

11) To provide a sensor which remains closed after it triggers during a crash.

12) To provide an hermetically sealed crush zone mounted crash sensor.

13) To provide a sensor which cannot be reused after it has been involved in a crash where the airbag deployed.

14) To provide a crash sensor which has an integral connector thereby eliminating the need for wires to be connected inside the sensor housing.

15) To provide an hermetically sealed sensor which is easily assembled and does not require glass-to-metal seals.

Other objects and advantages of the present invention will become apparent from the following description of the preferred embodiments taken in conjunction with the accompanying drawings.

BRIEF DESCRIPTION OF THE DRAWINGS

FIG. 14 is a plane frontal view of another preferred embodiment of the sensor illustrating the weakening of portions of the tube to promote bending at particular locations.

FIG. 15 is a view of the sensor of FIG. 14 taken along lines 15—15.

DESCRIPTION OF THE PREFERRED EMBODIMENTS

Figure 1:
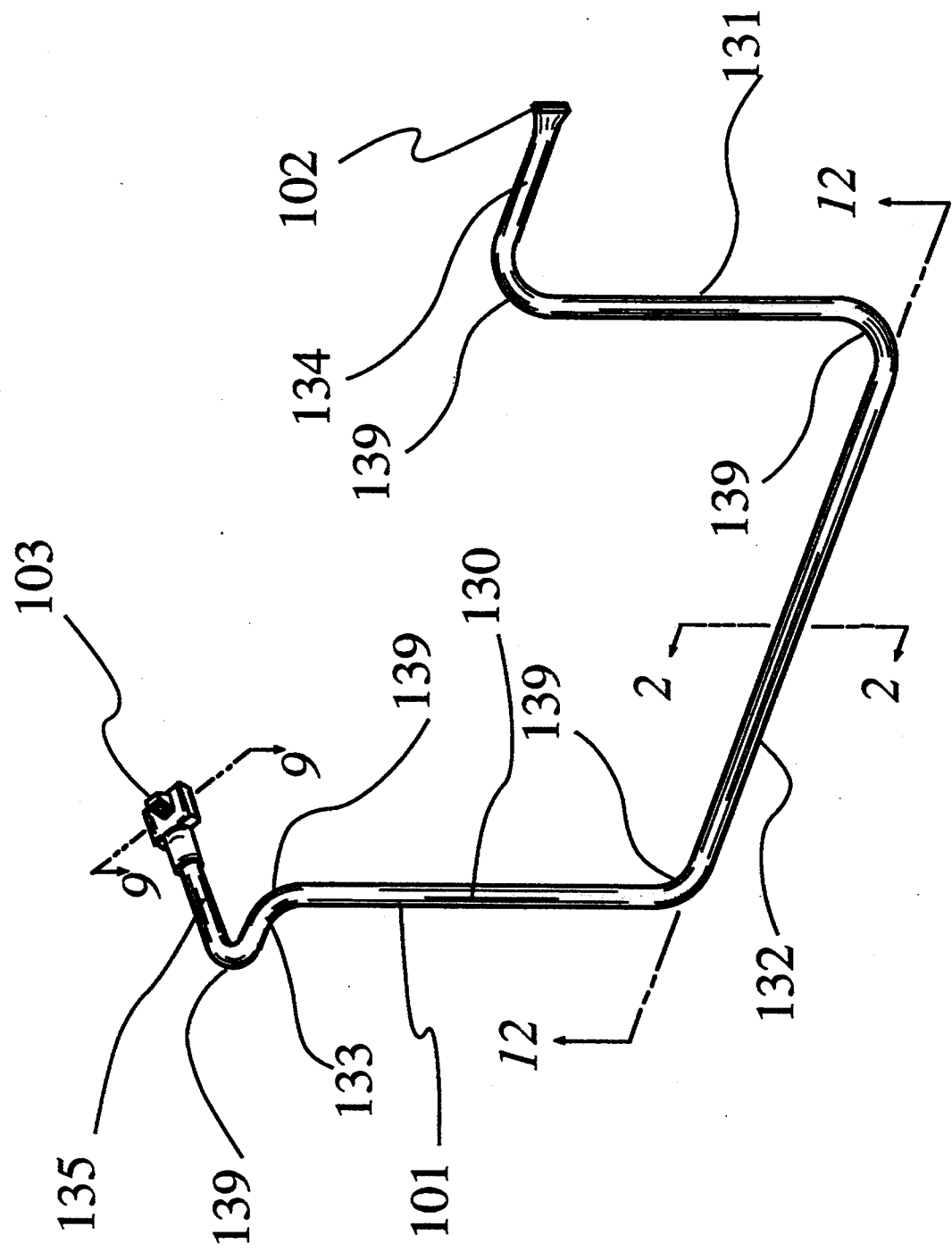
FIG. 1 is a perspective view of a preferred embodiment of the sensor of this invention shown removed from the vehicle.
Figure 2:
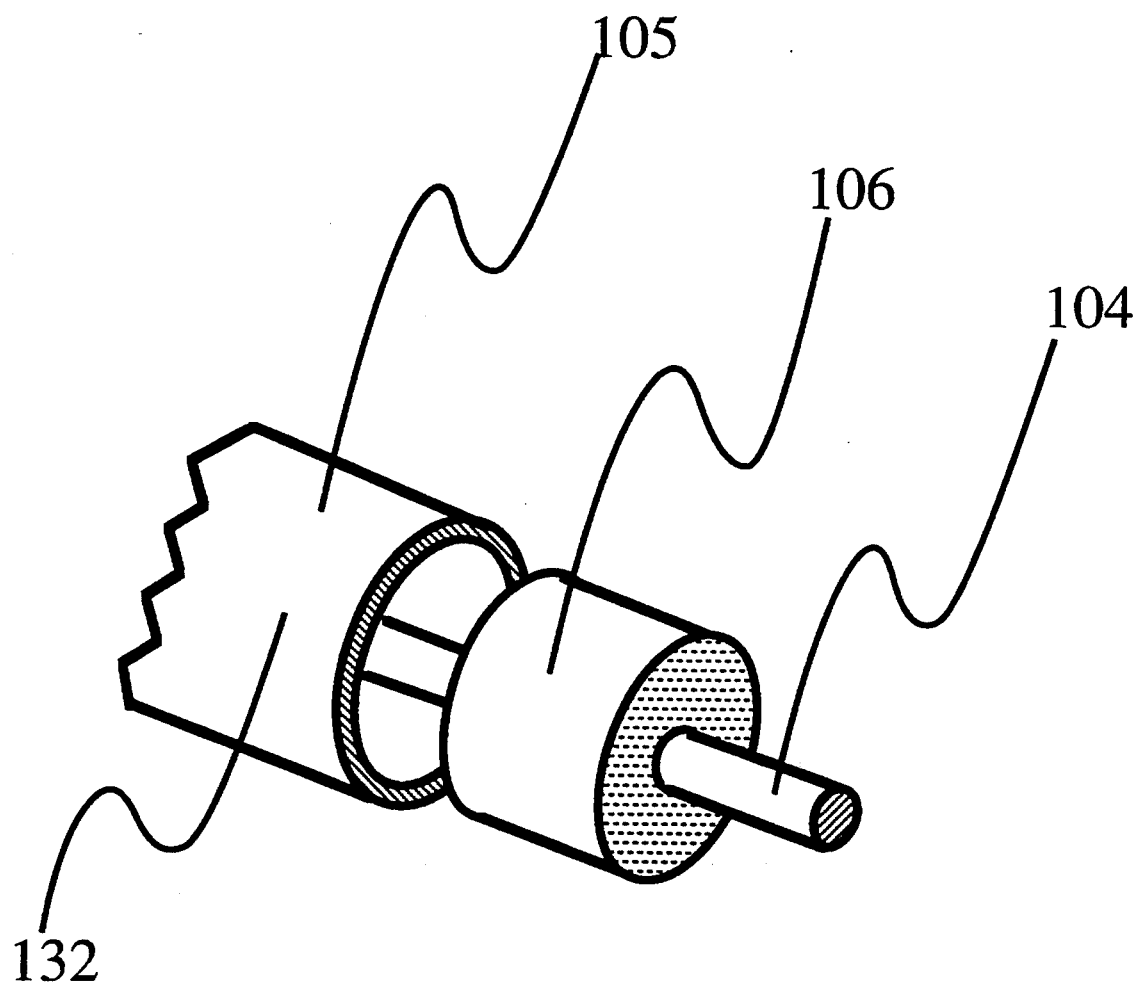
FIG. 2 is a view taken along lines 2—2 of the sensor shown in FIG. 1 with the interior parts pulled apart to illustrate the interior structure.
Figure 3:
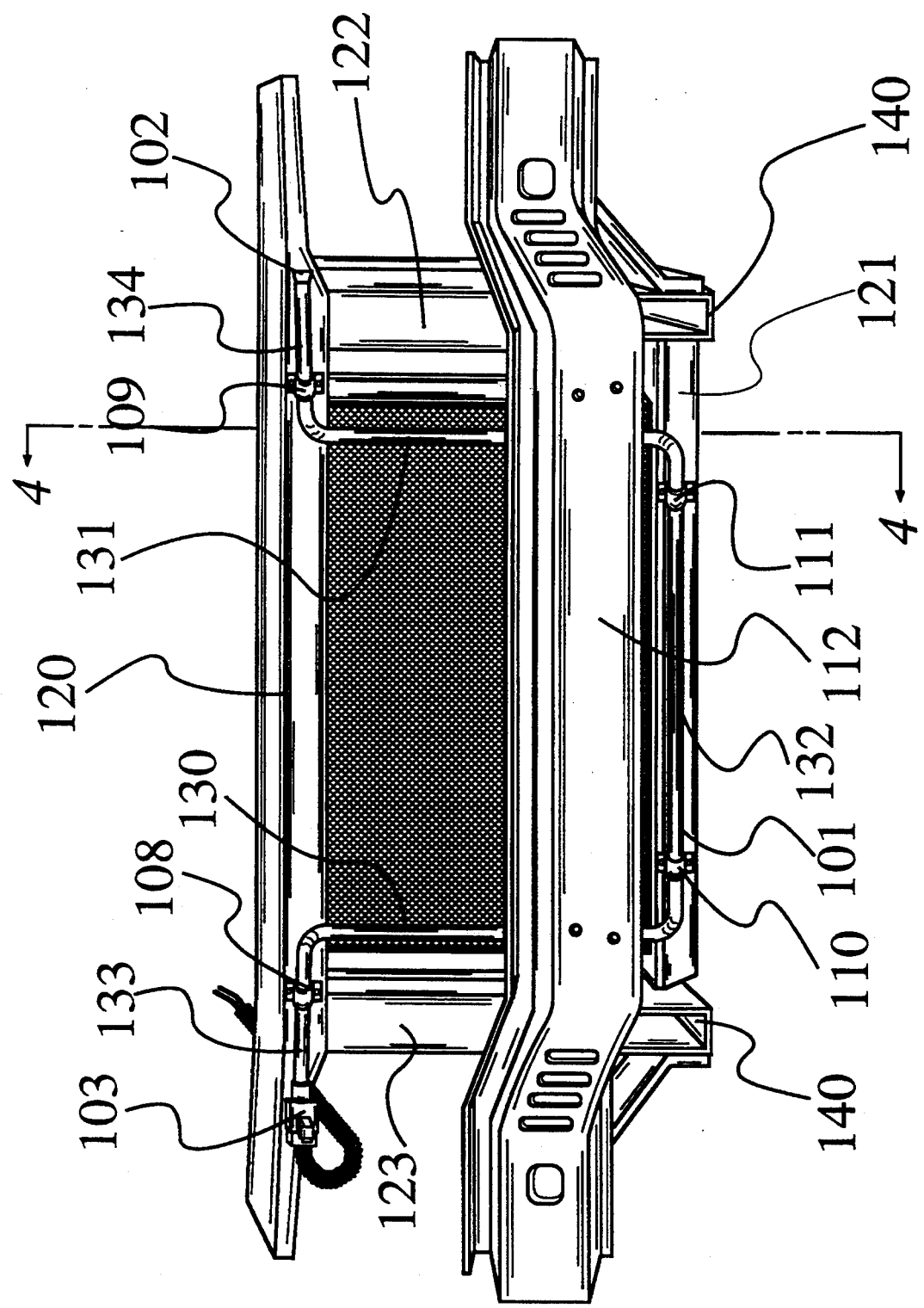
FIG. 3 is a frontal view of another preferred embodiment of the sensor of shown mounted on a vehicle with portions of the vehicle removed to permit viewing of the sensor.

The crush switch sensor constructed in accordance with the teachings of this invention is shown generally at 101 in FIG. 1. It consists of two vertical portions 130 and 131 a lower horizontal portion 132 two upper horizontal portions 133 and 134 and a rearward projecting portion 135. The tube is welded closed at the end 102 of horizontal portion 134 as described below and a header/connector 103 is attached to the sensor at the end of portion 135. The sensor is mounted to the front of the vehicle as shown in FIG. 3 and is constructed of a tube 105 and centrally located rod 104 as shown in FIG. 2. The sensor functions when it is bent at any position along the tube with the exception of the bent sections 139 which join the straight portions described above and where plastic spacers 106 prevent the rod from contacting the tube. When the sensor is bent during a crash, the rod contacts the tube completing an electrical circuit which results in a deployment of the airbag passive restraint system.

The rod is maintained in a central location within the tube as illustrated in FIG. 2 by means of spacers 106 which are placed at each of the bends in the tube and, in one preferred embodiment, in the center of the lower horizontal portion 132 as shown in FIG. 2. The spacers are made from plastic or other suitable flexible material such as rubber. Although in the preferred embodiment shown in FIG. 1, spacers are only placed in the bends 139 and at the center of the horizontal portion 132, in other embodiments, spacers can be placed arbitrarily along the length of the sensor in order to adjust the sensitivity of the sensor to particular crash events. The effect of the spacers is dramatic. The deflection required to trigger the sensor at the center of the lower horizontal portion 132 is approximately 0.1 inches if the spacer is not present, and greater than 1 inch if the spacer 106 is present.

The crush switch sensor of this invention is shown mounted on a vehicle in FIG. 3 where a substantial portion of the vehicle has been removed to better illustrate how the sensor is mounted. In the configuration in FIG. 3, the rearward portion 135 of the sensor has been eliminated and the sensor extends only toward the outside of the vehicle. The vehicle structure shown consists of the upper radiator support 120 two vertical radiator supports 122 and 123 and the lower radiator support 132. The two vertical radiator supports and the lower radiator supports are attached to the rails 140 which are the structures of the vehicle which support the front end. The structure of the bumper 112 but not the bumper facia is also illustrated in FIG. 3. The crush switch sensor of this invention is attached to the upper radiator support by means of attachment hardware 108 and 109 and to the lower radiator support by means of attachment hardware 110 and 111.

Figure 4A:
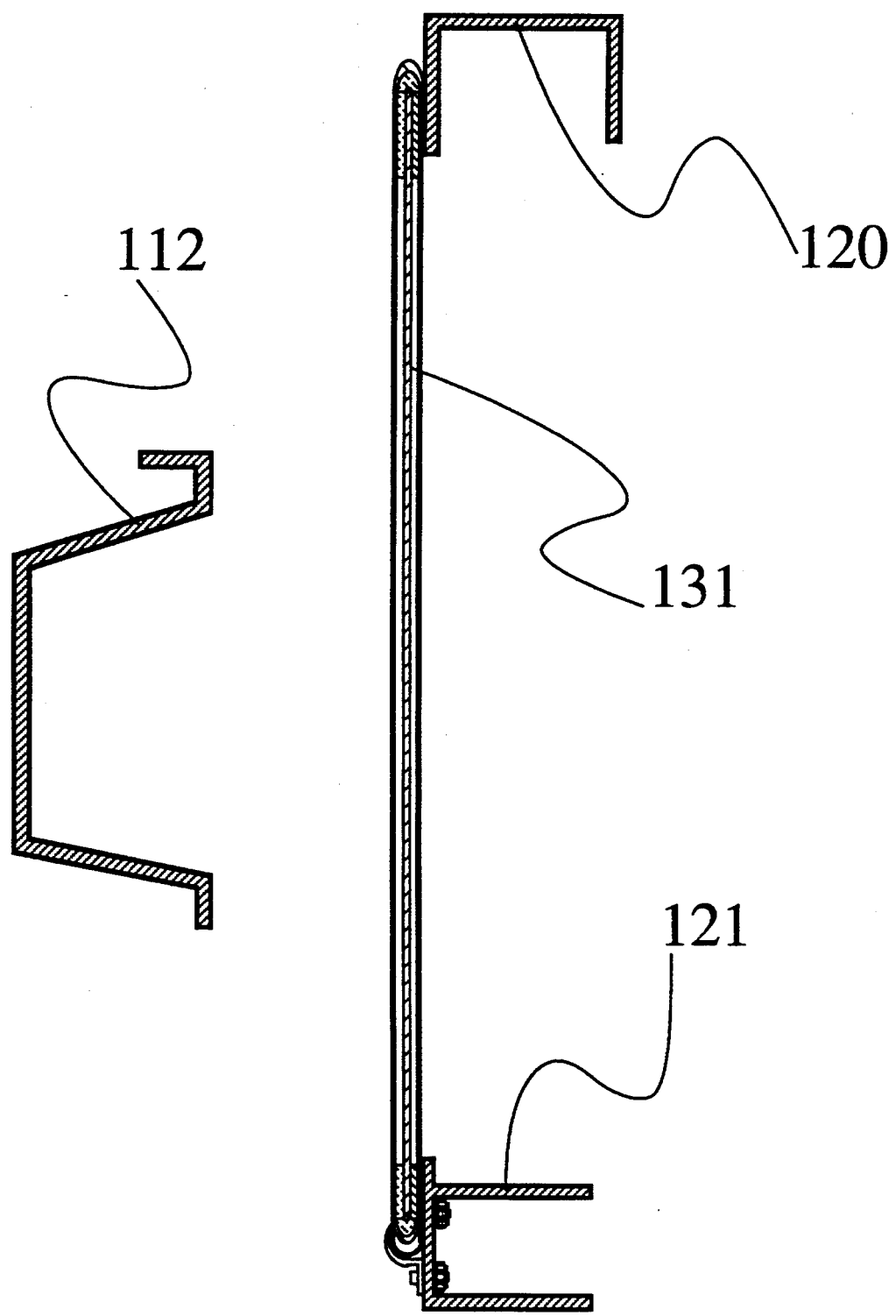
FIG. 4A is a view of a vertical segment of the sensor shown in FIG. 3 taken along lines 4—4 in a condition before being impacted by the vehicle bumper during a crash. (done)
Figure 4B:
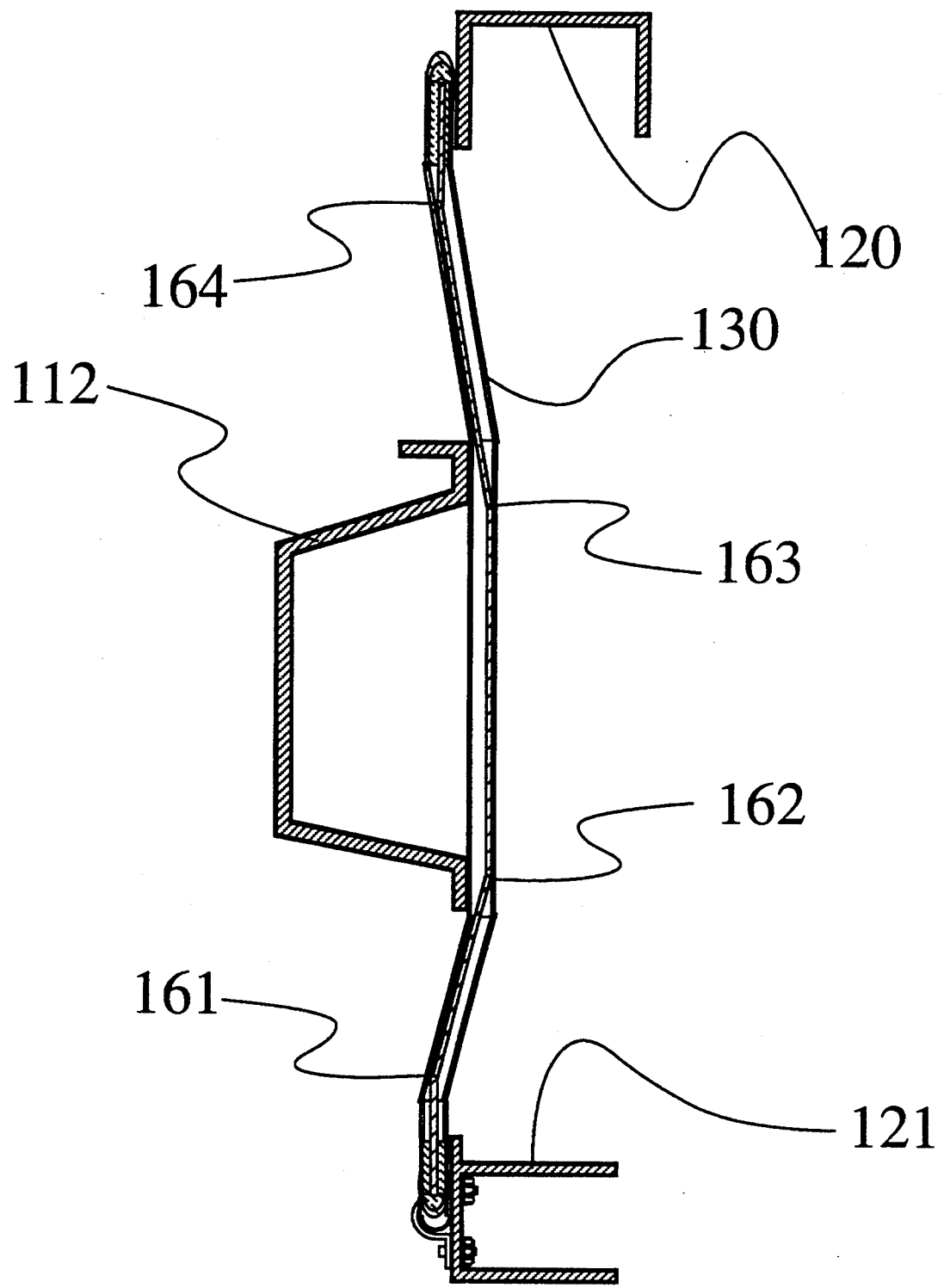
FIG. 4B is the same view of the sensor shown in FIG. 4A after being impacted by the vehicle bumper during a crash.

During a frontal impact with either a barrier or another vehicle, for example, bumper structure 112 is displaced toward the rear relative to the radiator supports of the vehicle where it impacts the vertical portions 130 and 131 of the crush switch sensor 101. This sequence is illustrated in FIGS. 4A and 4B which are views taken along lines 4—4 of FIG. 3. Upon impact with sensor vertical portion 131, bumper structure 112 causes the rod and tube assembly to bend which in turn causes the rod to contact the inside of the tube, at 161, 162, 163, and 164, completing the electrical circuit and initiating deployment of the airbag. Although in this case four contacts are made between the rod and the tube, only one is necessary to cause deployment of the airbag. In this manner, any crash which causes the bumper to be displaced toward the rear in the vehicle will cause the sensor to trigger.

Not all crashes involve the bumper and in a survey of crashed vehicles (see SAE paper 930650) as many as 30% of the surveyed vehicles were involved in crashes where the bumper was not primarily involved. A typical crash of this type involves a car which is breaking and therefore pitching forward which lowers the front bumper and raises the rear bumper. If this car is struck in the rear by another vehicle which is similarly pitching, the striking vehicle will impact the struck vehicle with the front bumper of the striking vehicle riding underneath the rear bumper of the struck vehicle. In this case, the bumper of the struck vehicle will impact the grill and radiator of the striking vehicle and displace the vertical portions 130 and 131 of the crush switch sensor of this invention. In so doing, airbag deployment is initiated.

When the bumper is involved in an accident, it generally maintains its structural shape until it begins impacting the radiator and other structures behind the radiator. This is after it has impacted the sensor. Since the bumper structure has not yet deformed when it strikes the sensor, the sensor triggers on a crush of the vehicle equivalent to the distance between the rear of the bumper structure and the sensor, plus the amount of sensor deflection required to trigger. If the bumper is not primarily involved in the accident, the amount of penetration into the vehicle required to trigger the sensor, measured from the front of the bumper, will be greater by the amount of the thickness of the bumper. In this manner, the sensor system requires greater penetration into the vehicle in bumper underride crashes. This results in a longer time to trigger which is desired since such crashes are softer than those crashes which involve the bumper and therefore there is more time available before the airbag needs to be deployed.

Figure 5:
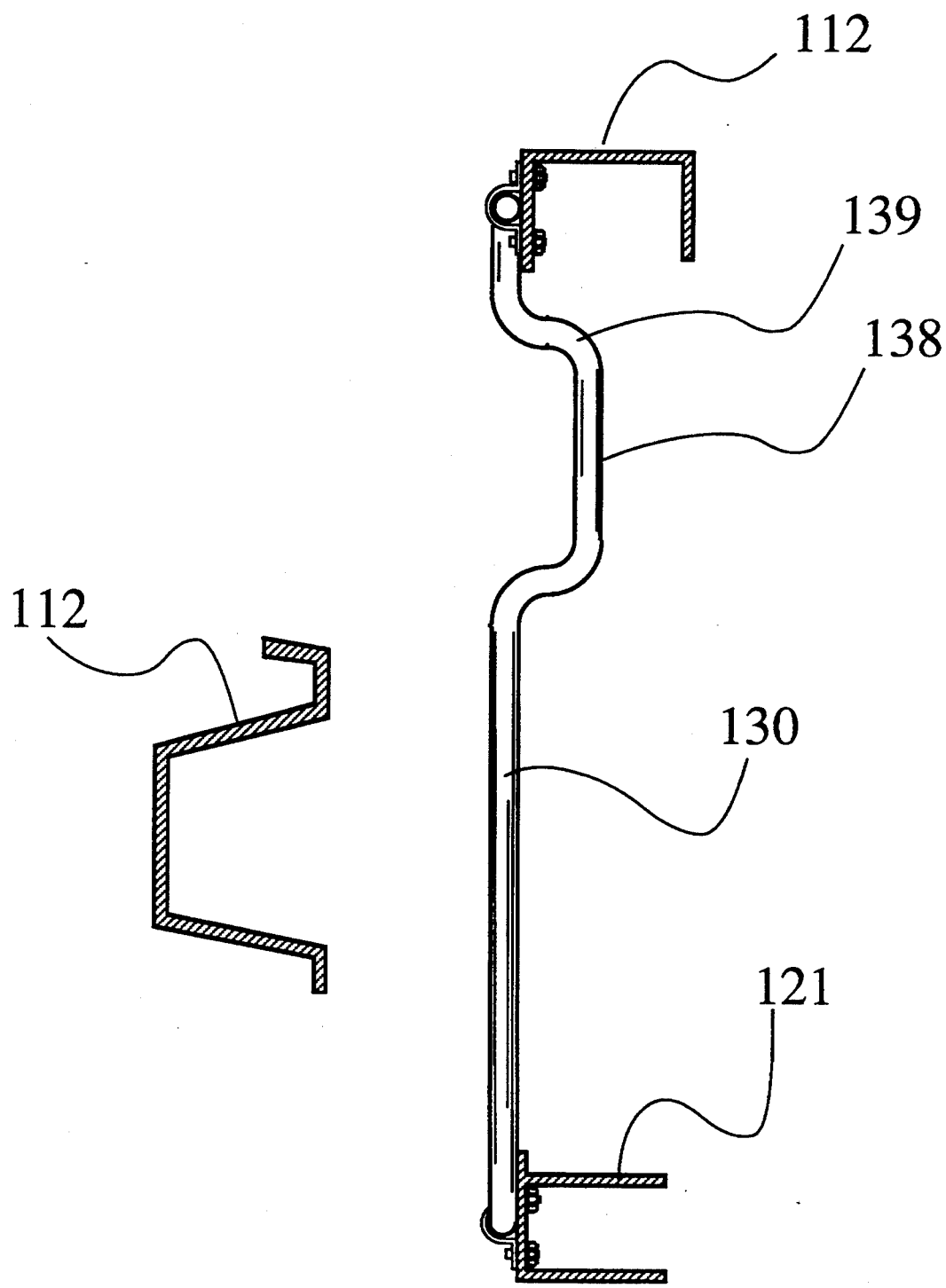
FIG. 5 is a partial view of an alternate configuration of a vertical portion of the sensor of FIG. 4A showing it displaced rearward to reduce its sensitivity to impacts above the bumper.

In some cases, it is necessary to further desensitize the sensor to bumper underride type crashes to make the sensor less sensitive to deer impacts, for example. Every year in the United States there are approximately 300,000 impacts with deer and in most cases airbag deployment is not wanted. Currently used sensor systems, however, can cause the airbag to deploy on deer impacts. When impacted at high speeds, the crash pulse in the non-crush zone can be similar to the crash pulse from a barrier crash up to the time that the decision must be made to deploy the airbag. In such cases, electronic sensors operating on the non-crush zone crash pulse will determine that the airbag deployment is required. Currently used crush zone sensors are typically mounted above the bumper and project outward from brackets attached to the upper radiator support. These sensors are impacted by a deer even at lower speeds and experience a velocity change sufficient to set off the airbag. The crush switch sensor of this invention, however, can be desensitized in a manner such as shown in FIG. 5 so as to render it insensitive to deer impacts. In this case, a section, 138, of the vertical portion, 130, of the sensor has been displaced rearward to render it less sensitive to deer impacts.

Figure 6:
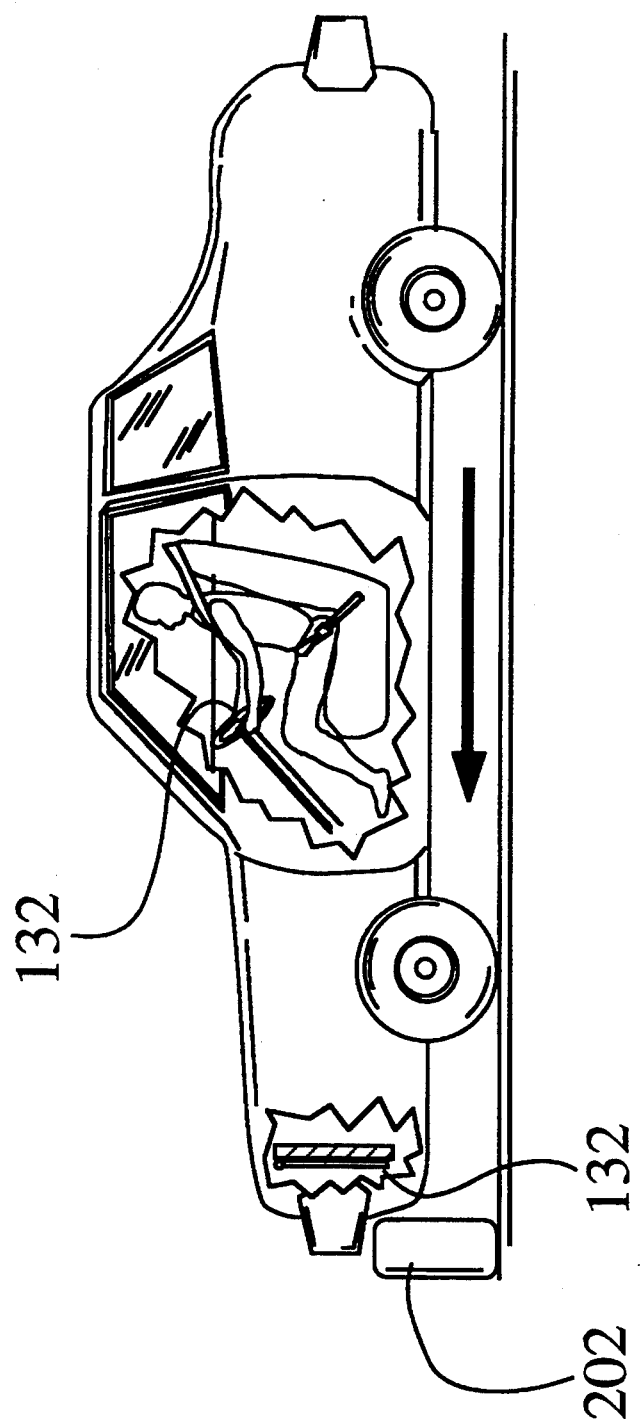
FIG. 6 is a view of a vehicle taken from the side, with certain portions removed, which is about to impact a low pole which misses the bumper, illustrating the ability of the sensor to respond to this type of crash.

Approximately 2% of frontal crashes involve impacts to the vehicle below the bumper. In a typical case, a vehicle impacts with a large stone, tree stump or short or low pole which miss the bumper. This type of accident is expected to become more common since in order to make vehicles more aerodynamic, vehicle hoods have been made lower and the radiators have also been lowered until as much as one-third of the radiator now projects below the lower edge of the bumper. An impact with a short pole such as shown in FIG. 6 where the pole interacts with the lower portion of the radiator, can result in an airbag required crash which will not be properly sensed by current sensor technology. The ball-in-tube crush zone sensors are typically mounted above the bumper and therefore would not be in the crush zone for this kind of a crash causing them to trigger on the non-crush zone crash pulse resulting in a late deployment of the airbag. The preferred embodiment of the crush switch sensor of this invention shown in FIG. 6, on the other hand, stretches across the front of the vehicle and will trigger causing the airbag to deploy in time on these crashes.

Figure 7:
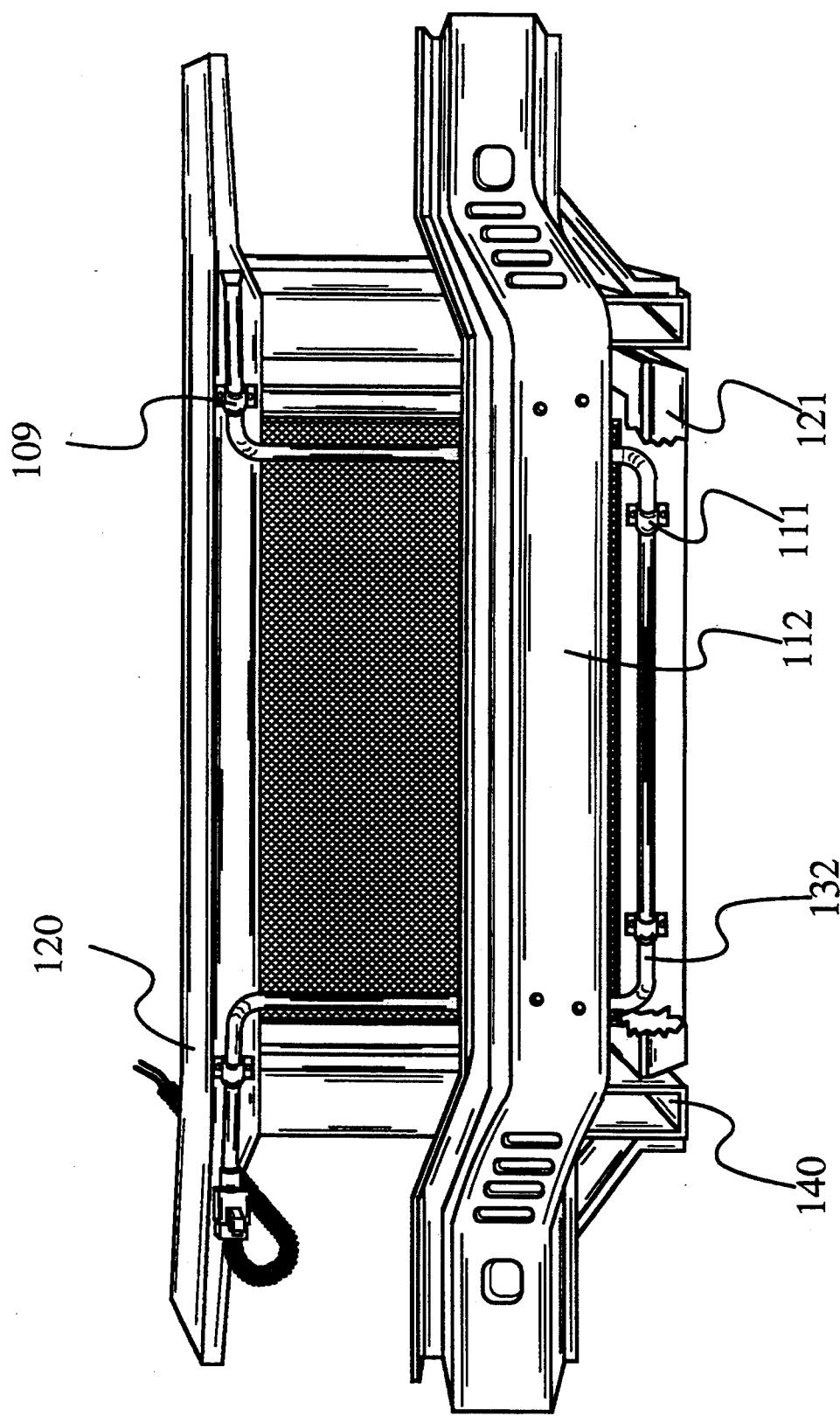
FIG. 7 is a view of the sensor of FIG. 1 showing an alternate configuration of the lower horizontal portion of the sensor showing it mounted within the lower radiator support.

In some cases, particularly with sport and utility vehicles which are used off-road, it is necessary to protect the lower horizontal portion 132 of the crush switch sensor from the possibility of damage or false triggering caused by impacts with stones, the ground or other objects which might be encountered. In this case, the sensor lower horizontal portion 132 is placed inside of the lower radiator support 121 as illustrated in FIG. 7. Most of the lower radiator support has been cut away in this figure to illustrate the mounting location of the sensor. For this example, the sensor would not trigger unless there were significant crush or deformation of the lower radiator support which would only happen during an impact of sufficient severity as to require the deployment of the airbag.

About the most common of all real world airbag crashes involve impacts with poles. Pole impacts are some of the most difficult crashes to sense properly with current airbag sensor technology. Poles that can require airbag deployment vary in diameter from as little as 4 inches to greater than 24 inches. They involve such objects as fence posts, light poles, trees and telephone poles which are the most common obstacles found along the sides of roads. An impact into a pole at any position along the front of the vehicle can result in a serious accident requiring deployment of the airbag. The stiffness of the vehicle, however, varies significantly from one part of the front to the other. For most vehicles the center front is the softest part of the vehicle, and the rails are the stiffest. In a typical accident the bumper will buckle around a pole resulting in a soft crash pulse until the pole penetrates sufficiently into the vehicle that it begins to engage major structural members or the engine at which time the pulse becomes very stiff. This type of crash pulse is particularly difficult for non-crush zone sensors to sense properly.

Pole crashes are typically staged by automobile manufacturers during their airbag development programs, but they are limited in scope. They typically involve large poles that are a foot or more in diameter and are usually run at high speeds. It has been found, however, that thin poles at low speeds are much more difficult to sense than thick poles at high speeds. Non-crush zone sensors have a particularly difficult time in sensing pole crashes especially those involving thin poles at low velocities, since the crash pulse is very soft until it is too late to initiate airbag deployment. Conventional crush zone sensors, such as the ball-in-tube sensor, function properly as long as the sensor is located at the in-line with the impact point of the pole. When this is not the case, and especially when the impact speed is low, ball-in-tube sensors can also fail. A particular case, for example, involved a vehicle which has three ball-in-tube sensors mounted in the crush zone, one center mounted and one on each side approximately in line with the rails. This vehicle impacted a pole at approximately 15 miles per hour at a point midway between the front and side sensors. An examination of the vehicle showed that there was no crush at either of the sensor locations. In this case, the sensor triggered the airbag late based on the non-crush zone crash pulse as described in Breed U.S. Pat. No. 4,900,880 referenced above. Before the airbag deployed the occupant had already impacted with the steering wheel and although conscious after the accident, later died from internal injuries. The crush switch disclosed here, in the embodiment illustrated in FIG. 3, would have triggered in time on this and all other pole impacts since it stretches across the entire front of the vehicle.

In a small but significant percentage of automobile crashes (less than 2%), the point of impact is outside of the main vehicle supporting structure which is typically the rails. In a common accident, a vehicle impacts a pole at approximately the headlight at a slight angle and the pole penetrates into the vehicle with little resistance until it encounters the front wheel structure at which point the vehicle rapidly stops. This crash cannot be properly sensed by any conventional airbag sensor system in use today. Electronic sensors will either trigger late or not at all due to the very soft nature of this crash up to the point where the pole impacts the wheel structure which is too late. Conventional crush zone sensors are usually mounted inside the rail structure and thus are not in the crush zone for this crash. They also, therefore, would either not trigger or trigger late. The crush switch sensor of this invention as shown in FIG. 3 projects only slightly beyond the rail structure and therefore could also miss this type of crash. FIG. 7, on the other hand, illustrates the extension of the upper horizontal portions 133 and 134. These extensions would trigger the deployment of the airbag in this pole crash and other airbag desired crashes outside of the rail structure. This crash is, as mentioned, a soft crash and therefore there will be substantial penetration before the sensor must trigger. The upper horizontal portions 133 and 134 therefore could be angled toward the rear in the vehicle to adjust the penetration required for the sensor to trigger.

In order for current technology crush zone sensors to sense this crash in time, additional sensors would have to be placed outboard of the rails. As mentioned above, even three sensors are insufficient to catch all pole crashes to the front of the vehicle and when bumper override crashes are considered, such as the low pole crash described above, additional sensors are required. A primary advantage of the crush switch sensor of this invention is that a single sensor can be used to sense crashes to all portions of the front of the vehicle. To achieve the equivalent coverage using conventional sensors would require at least five and probably more sensors. The manufacturing cost of a sensor described in this invention is about equivalent to the manufacturing cost of a single ball-in-tube crush zone sensor. Therefore, in addition to the substantial performance advantage, there is also a substantial cost advantage in using the sensor described herein. In addition, a significant cost in a sensor system is the cost of the wires to connect each sensor to the remainder of the airbag system. It is typical for a wire and connector assembly plus the cost of insulation to be as much as half of the cost of the sensor itself. In the sensor described herein, a single wire assembly is all that is required to connect the sensor to the airbag system. With conventional crush zone sensors a separate wire assembly is needed for each sensor. Finally, in order to minimize the possibility of the conventional crush zone sensor from rotating during angle crashes, for example, the mounting structure, typically the upper radiator support, is frequently strengthened to provide a more rigid mounting structure for the sensor. This modification to the vehicle structure is not required for the sensor described herein and therefore additional cost savings result.

The environment experienced by a sensor mounted in the front of the radiator on a vehicle is one of the most severe in the automobile. In addition to the extremes of temperature encountered between Alaska and the Arizona desert, this location is impacted by hail, stones, dust, dirt, salt water, radiator coolant, steam cleaner and occasionally even battery acid. This sensor must be capable of surviving any combination of these environments for the useful life of the car which is typically taken to be in excess of ten years. It is important, therefore, that this sensor be hermetically sealed. A great deal of effort has been put into the current crush zone sensor to seal it from these environmental influences. Nevertheless, sensors that have been on vehicles have been dissembled and found to contain moisture. Although moisture would not have as detrimental effect to the switch sensor described here as it does to conventional crush zone mounted sensors, the sensor has nevertheless been designed to be truly hermetically sealed as described below.

Figure 9:
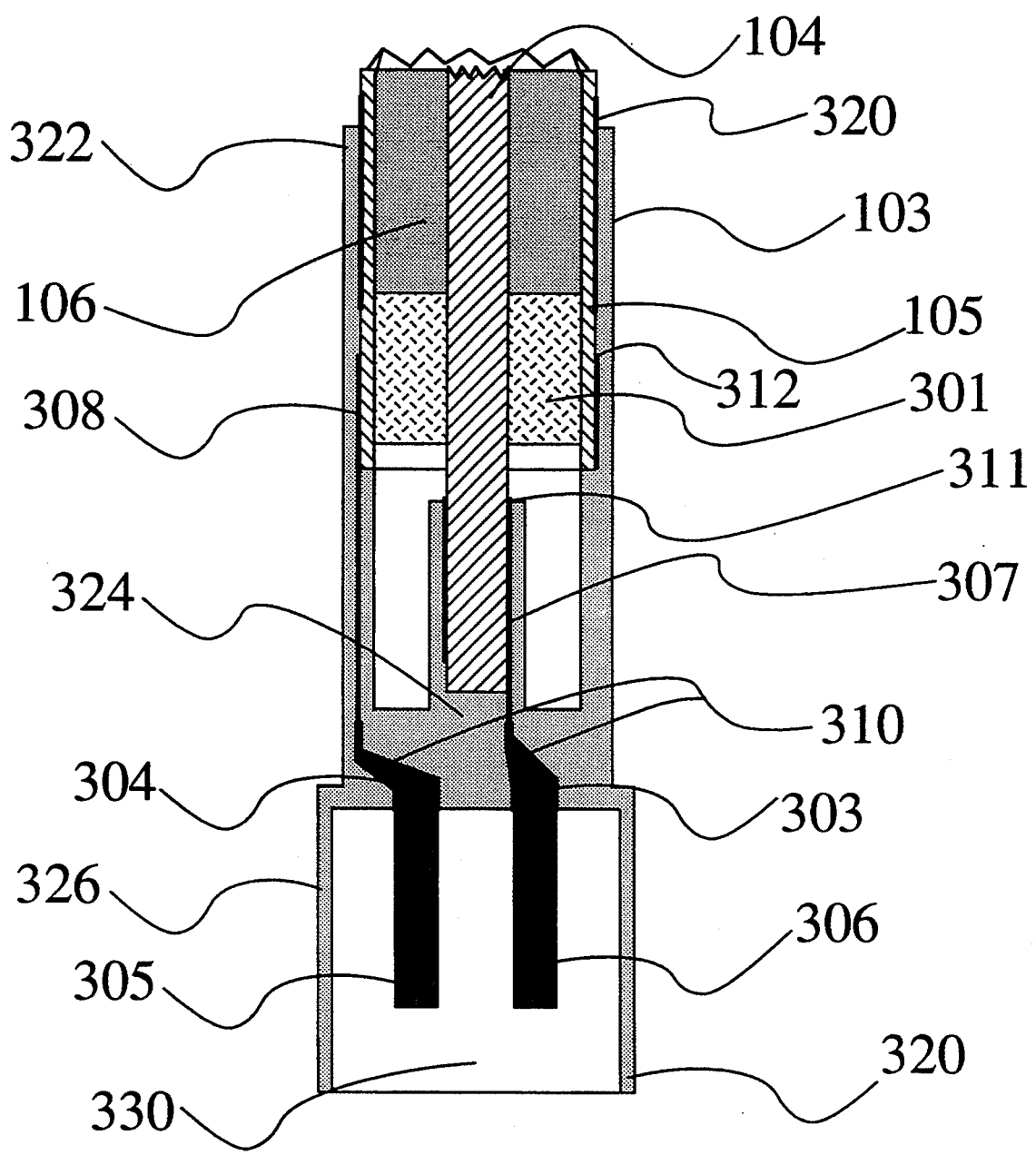
FIG. 9 is a cutaway view of the header/connector assembly of FIG. 1, taken along line 9—9, illustrating the construction details and in particular the method of sealing the sensor.

FIG. 9 is a cross section view of the header/connector 103 shown mounted on the tube 105 and rod 104. A spacer 106 is used to position the rod 104 inside the tube 105 as described above. The primary seal for this sensor is provided by a filled epoxy 301. One such epoxy is product number 2214 which is a one part epoxy manufactured by 3-M Corporation of Minneapolis, Minn. Another preferred epoxy is a mineral filled epoxy as manufactured by the Pave Technology Corporation of Vandalia, Ohio. These epoxies bond well to the rod 104 and internal surface of the tube 105 and maintain a seal over the automotive under hood required temperature range of −40° C. to plus 125° C. The 3M epoxy is filled with aluminum and improved performance can be achieved through the use of other fillings such as silica and titanium oxide which result in a product which has a lower coefficient of thermal expansion as in the case of the Pave product. It has been shown in tests conducted by the Pave Technology Corporation that when one-half inch length of epoxy material is used, a true hermetic seal results. The lowest coefficient of thermal expansion can be achieved by filling the epoxy with Kevlar. Kevlar is a plastic fiber which has a negative expansion coefficient over a limited temperature range and when used as a filler for epoxy can cause the filled epoxy to have an expansion coefficient which is the closest to steel of the fillers mentioned above.

Current ball-in-tube crush zone sensors are attached to the vehicle wire harness and thus to the remainder of the airbag systems by means of a pigtail which is a wire assembly emanating from the sensor at one end and having a connector at the other end. It is believed that the environment in front of the radiator is too severe for connectors, therefore connectors integral with the sensor have not been considered. This pigtail is one of the most expensive parts of the standard ball-in-tube crush zone sensor. Substantial cost savings result if the connector could be made integral with the sensor. This has been accomplished in the crush switch sensor of the current design as shown in FIGS. 1, 3 and 9 providing seal 301 is a true hermetic seal and therefore moisture is not able to pass from the outside of the sensor to the inside. The remainder of the header/connector assembly need not be sealed but in order to further ensure that moisture will not penetrate the sensor, a second hermetic sealing system has been provided. This has accomplished through the use of B-stagable epoxies applied at 310 and 320 to the header pins and 303 and 304 to the tube 105. This material which is initially a solid, is first diluted with a solvent to form a liquid which then can be painted onto the tube 105 and to the header pins 303 and 304. When the header pins are insert molded to form the header/connector assembly 302, the heat from the molding process activates the B-stagable epoxy 310 causing it to react and bond to the metal header pins 303 and 304 and to the plastic 324 thus forming the desired hermetic seals. Similarly, when the header/connector assembly is assembled to the tube, heat and pressure is applied to the outside of the header/connector assembly at 322, which simultaneously softens the plastic and heats the epoxy 320 sufficiently to cause the epoxy to bond to the tube 105 and also to the header/connector assembly 302 forming a hermetic seal at that location. In this manner, a second set of hermetic seals is formed, preventing moisture from traveling between the cavity 330 in the connector portion of the header/connector assembly and the interior of the crush switch assembly.

The preferred plastic material used for the header/connector is 30% glass filled polyester. Standard crush zone sensor connectors are frequently made from unfilled Nylon. This would not be suitable for the header/connector design used in the sensor of this invention since unfilled Nylon has a high coefficient of thermal expansion and therefore would develop high stresses in the epoxy 320 when it is sealed to the tube 105 using the B-stagable epoxy as described above. The addition of substantial glass filling to the polyester substantially reduces its thermal expansion coefficient so that it is closer to that of the steel thus resulting in smaller stresses in the epoxy seal.

The lower portion 326 of the header/connector assembly 103 shown in FIG. 9, is in the form of a mating connector which attaches to the wire harness connector provided by the automobile manufacturer. Connector pins 305 and 306 are extensions of the header pins 303 and 304 and are designed to mate with the appropriate connector. The header pins are formed from sheet brass in such a manner that they surround the rod and tube and are electrically connected thereto. This is accomplished in the case of the tube, for example, by solder coating the end of the tube starting at 312. The mating portion 308 of the header pin 304 surrounds the tube and through induction heating, is soldered to the tube. Similarly, mating portion 307 of header pin 303 surrounds the rod 104 which has been soldered coated at its end starting at 311.

The header pins 303 and 304 are first formed from tin plated brass material to the proper shape and then placed in a mold in an insert molding operation to form the header/connector assembly 302.

Figure 10:
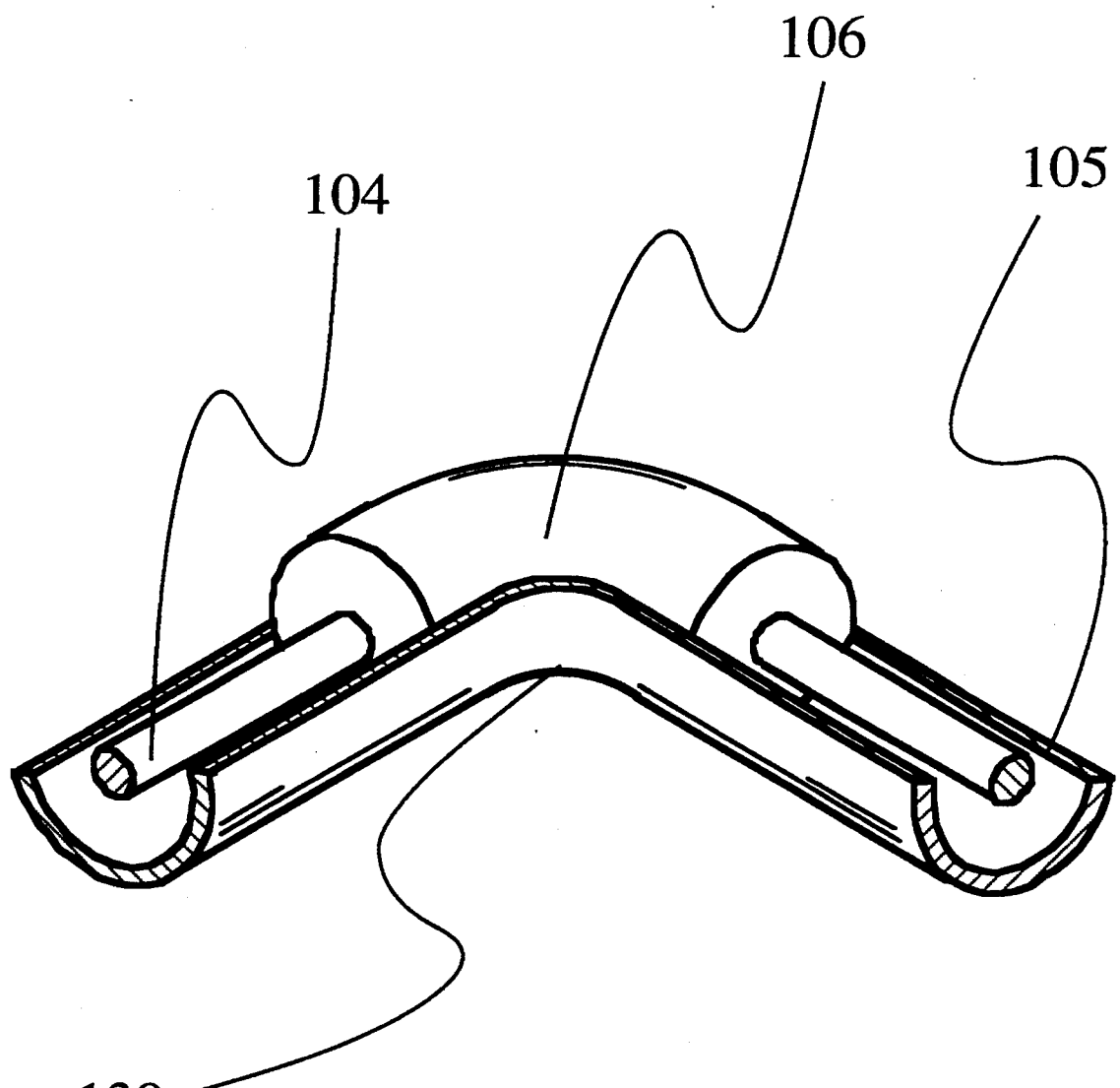
FIG. 10 is a partial cutaway view of a portion of the sensor illustrating a bend in the sensor.

Spacers 106 in addition to their use in a straight portion of the rod and tube assembly as shown in FIG. 2, are also placed in each of the bends 139. A partial cutaway view of a typical bend 139 is shown in FIG. 10. During assembly the spacers are placed on the rod and the rod is inserted into a straight tube with the spacers located at each position where the tube will be bent. The tube is then bent using conventional tubing benders and the rod is also forced to bend by virtue of the spacer. In a typical assembly, the tube outside diameter is approximately 0.5 inch and the wall thickness approximately 0.035 inches. The spacers are formed from extruded plastic tubing and are slightly smaller in diameter than the tube. The internal diameter of the spacer, however, is such as to require a press fit onto the rod. Thus, the tubes are held firmly on the rod as the rod is inserted into the tubing. Spacers used in the bends are typically about 3 inches long when used with a 0.5 inch tube and a one inch bend radius.

Figure 11:
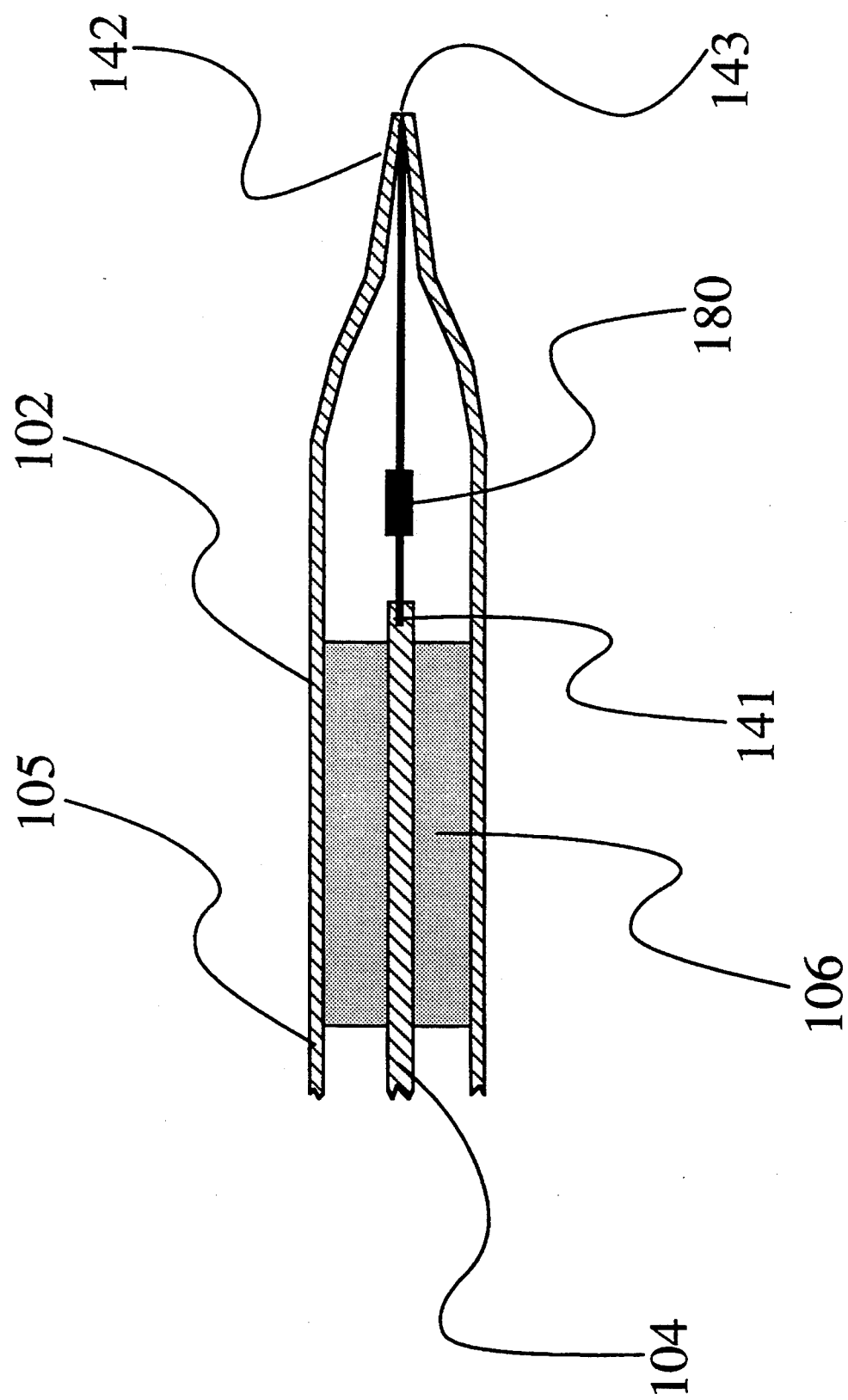
FIG. 11 is a cutaway of the sensor end showing the welded seal.

The end 102 of the sensor which does not have the header/connector is welded closed as shown in FIG. 11. Some vehicle manufacturers require a diagnostic resistor to be placed across the contacts in the sensor. This is accomplished as shown in FIG. 11 by attaching a resistor 180 to the end 141 of rod 104 and to the end 142 of tube 105. The end 142 is formed by squeezing the tube in the appropriate set of dies which gradually taper and flatten the tube, squeezing the end of resistor 180 and closing off the tube with a straight line seal. The end of this seal, 143, is then TIG welded using conventional equipment to assure a hermetic seal.

Figure 12:
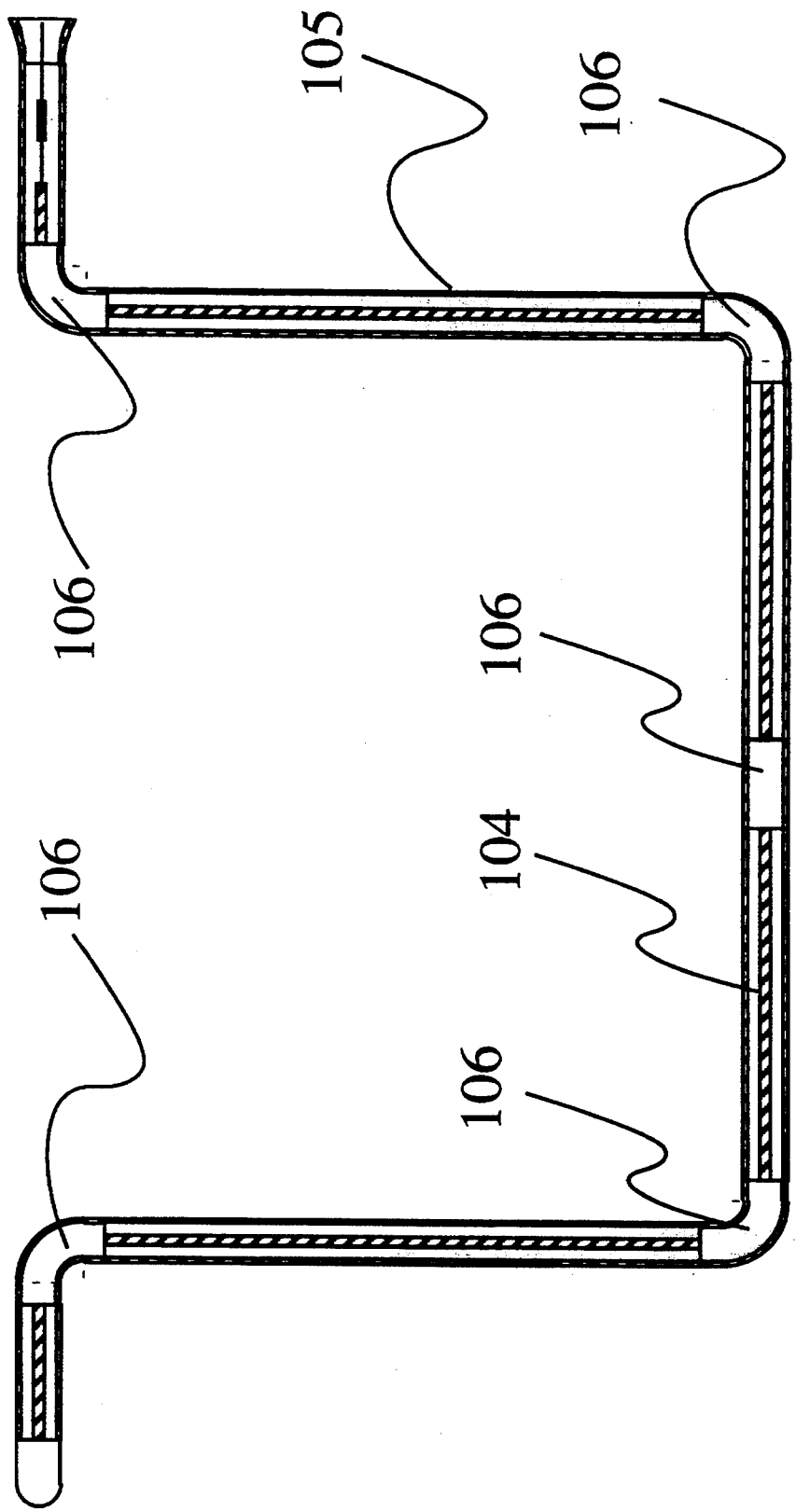
FIG. 12 is a view of the sensor of FIG. 1 with part of the tube and rod cut away illustrating the positioning of spacers within the sensor and their use to change the sensitivity of the sensor to deformation.

FIG. 12 is a view of the sensor of FIG. 1, with half of the tube and rod removed but showing complete spacers, taken along lines 12—12 showing the location of all of the spacers and the rod and tube.

Figure 8:
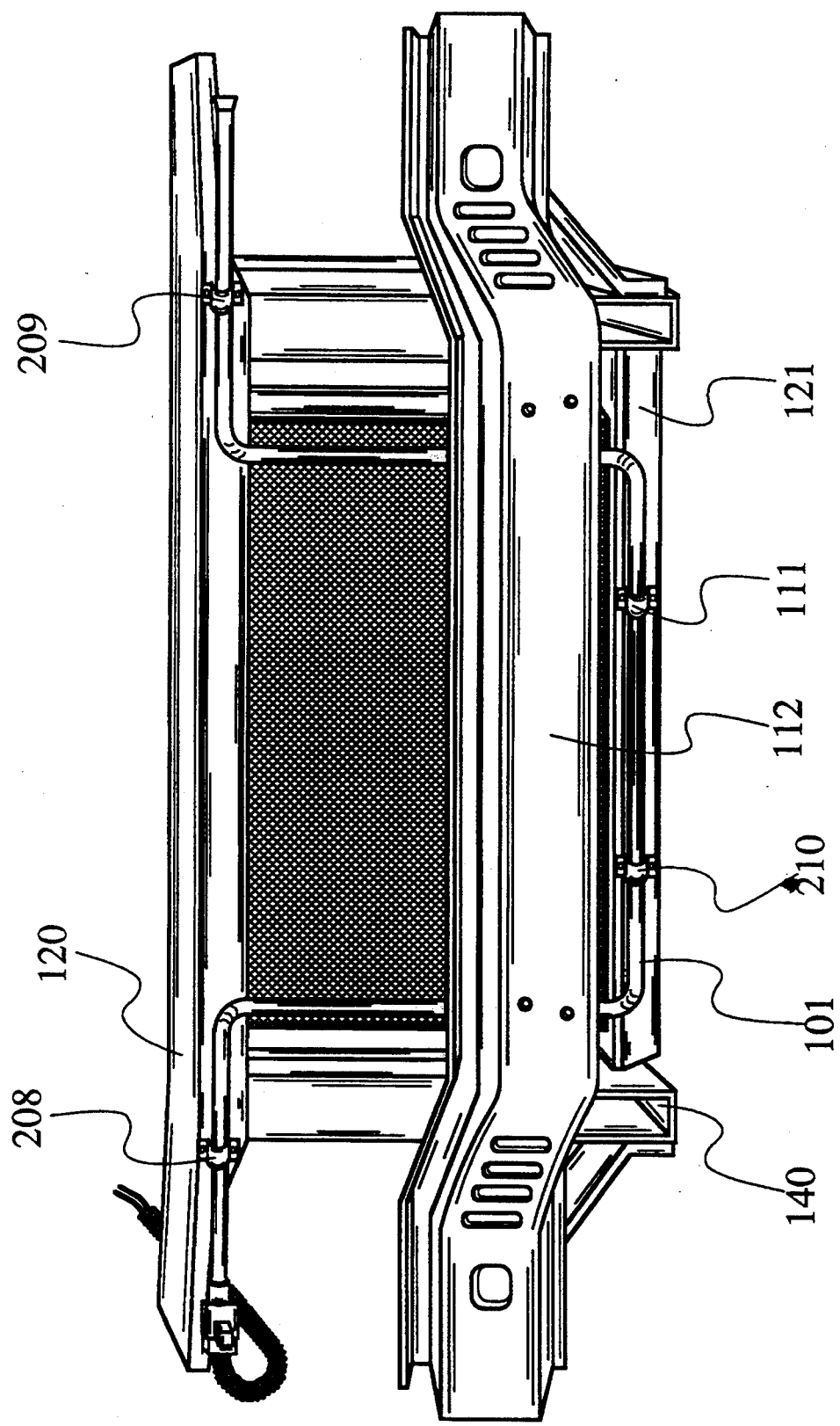
FIG. 8 is a view of the sensor of FIG. 1, with the ends of the sensor projected outside of the rails to sense far outboard crashes.
Figure 13:
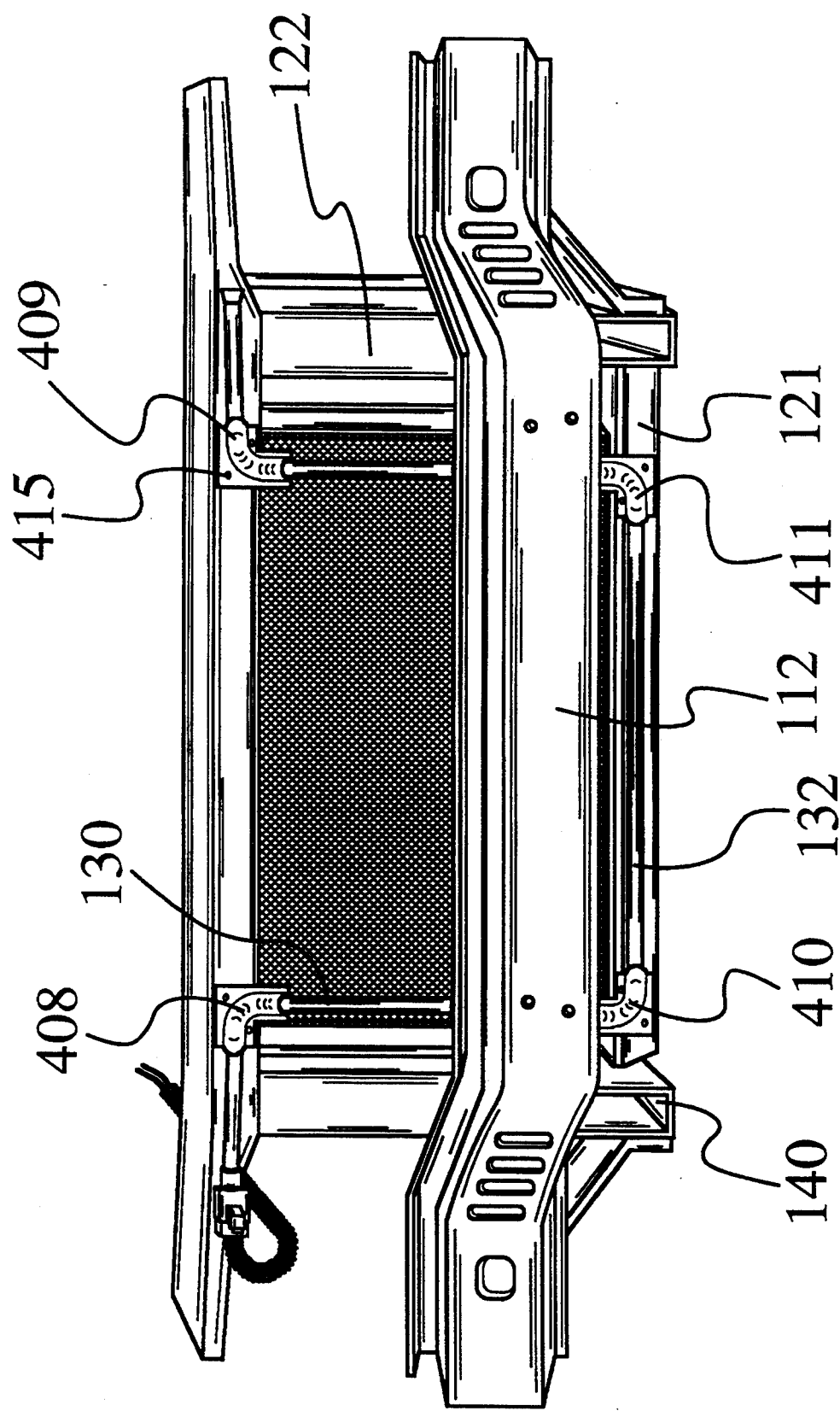
FIG. 13 is a perspective view of a preferred support for the sensor of FIG. 1 illustrating a type of built in support.

The supporting brackets 108, 109, 110 and 111 used to attach the sensor to the vehicle as shown in FIG. 3, act very much like simple supports in that the sensor sections can easily rotate about these supports. In some cases it is desirable to minimize this rotation and therefore achieve an earlier triggering of the sensor. This is accomplished using more rigid supports as shown in FIG. 13. These supports, 408, 409, 410 and 411 shown in FIG. 13 substantially surround the tube at both sides of a bend and are rigidly attached to the vehicle through the use of appropriate mounting bolts 415. Naturally, many other support designs could be used to either add flexibility or rigidity to the sensor mounting. Supports could also be located at different positions along the sensor, for example, and in some cases it would be desirable to mount these supports at locations between where spacers 106 are located rather than at these locations. An example is shown in FIG. 8 where supports 208, 209, 210 and 211 are so located. This increases the sensitivity of the sensor. Similarly, although the spacers described herein are made from semi-rigid plastic tubing and essentially fill the space between the rod and the tube, in some cases more flexible spacers and spacers which are considerably smaller in diameter would be applicable. A center span spacer such as shown in FIG. 2, for example, in some cases would be made substantially smaller than the internal diameter of the tube in order to increase the sensitivity of the sensor to deformations at that location. Thus by varying the properties and locations of the supporting brackets and the spacers, the properties of the crush switch sensor of this invention can be varied considerably.

A further variation of the sensor design is shown in FIG. 14 where sections of the tube 501, 502, 503 and 504, have been intentionally flattened in order to promote bending at those locations and increasing the sensitivity of the sensor. FIG. 15 is a view of the sensor of FIG. 14 taken along lines 15—15 further illustrating the flattened sections.

Figure 16:
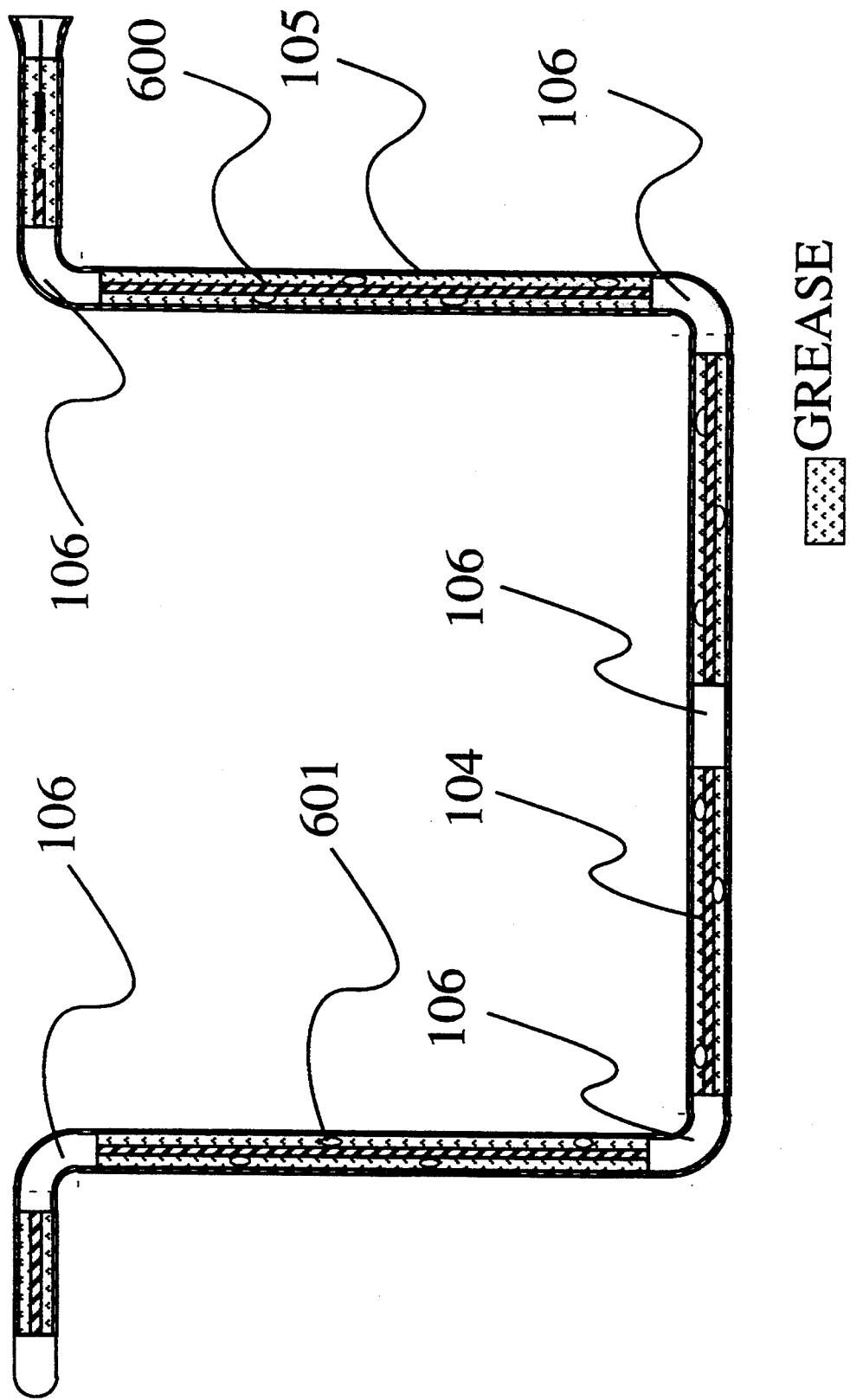
FIG. 16 is a view of the sensor of FIG. 1 with portions of the tube and rod cut away illustrating the use of a grease to fill the cavity between the rod and tube to minimize the effects of vibration and to protect the surfaces of the conductors from corrosion.
Figure 17:
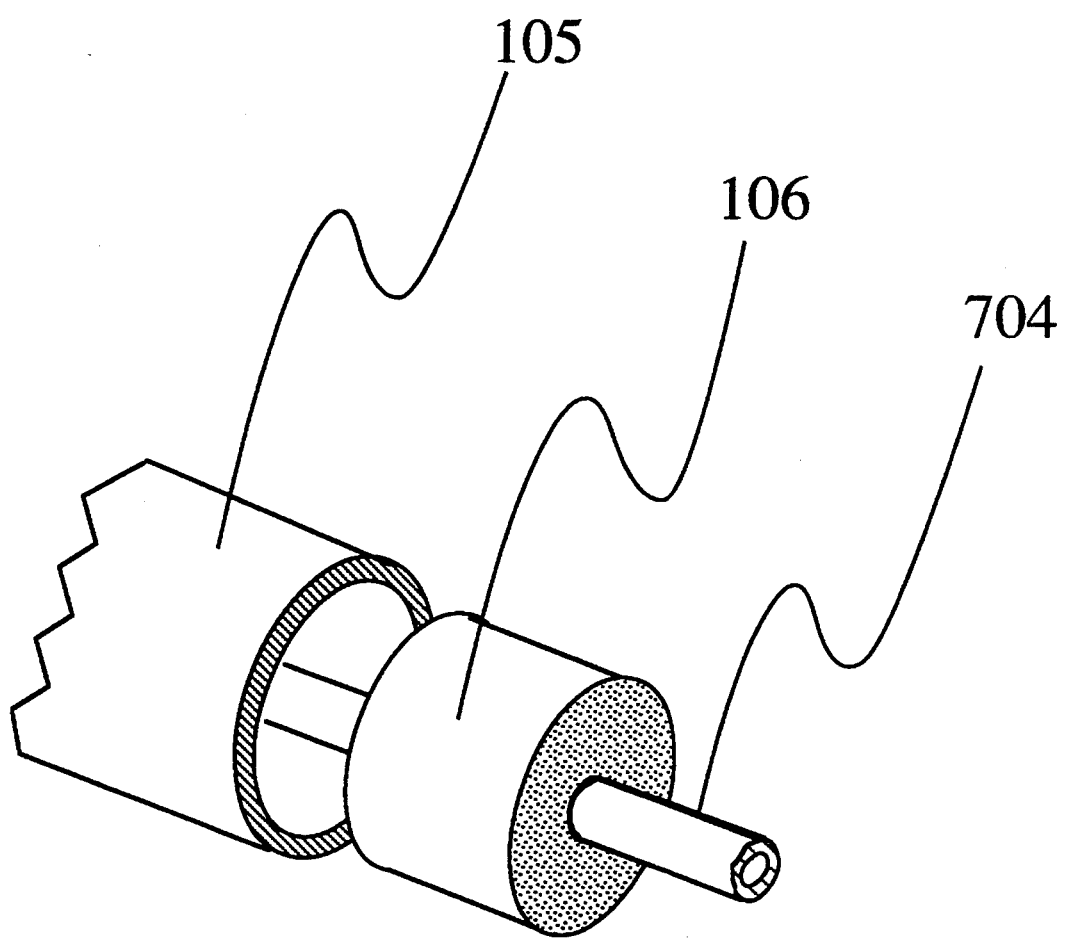
FIG. 17 is a view taken along lines 2—2 of the sensor shown in FIG. 1 with the interior parts pulled apart to illustrate the interior structure and with a tube used in place of the rod.

In a typical implementation the tube has an outside diameter of 0.5 inches and the rod is approximately 0.125 inches in diameter. A typical length of the span between spacers for the vertical portion 130 and 131 of FIG. 1 is approximately 10-15 inches. In this configuration, the rod will actually deflect and contact the tube during minor accidents and therefore in the preferred embodiment of the design, the tube is filled with a damping material which is typically a viscous liquid or grease which has been formulated to operate over the required temperature range of from −40° C. to 125° C. For the purposes of this disclosure, the term grease will be used to include all flowable materials having a viscosity between 100 and 100 million centipoise. This would include, therefore, all silicone and petroleum as well as other synthetic oils and greases. This grease 600 is shown in FIG. 16 where half of the tube 105 has been removed to show the grease 600 filling substantially the entire tube. Small voids 601 are intentionally placed in the grease to allow for differential expansion between the grease and the tube due to variations in temperature. When grease is used, small channels, not shown, are provided in the spacers 106 to permit the grease to flow past the spacers as the sensor is pumped full of the grease. Another method for minimizing the contact between the rod and the tube due to small velocity changes or to vibrations is shown in FIG. 17 which is a view similar to that of FIG. 2 with the rod 104 replaced by a tube 704.

The sensor described and illustrated above is designed to catch all impacts to the front of the vehicle regardless of where they occur. The severity of the crash required to cause sensor triggering is determined by the amount of crush of the vehicle at each location which is necessary to cause the sensor to close. The amount of crush necessary to trigger the sensor at any location can be varied arbitrarily by the distance the sensor is located from the front of the vehicle, by the location and characteristics of spacers in the sensor and by the location and characteristics of the supports that are used as discussed above. Crashes that do not involve the front of the vehicle rarely, if ever, are of sufficient severity to require deployment of the airbag. Airbags are designed to protect occupants in frontal impacts, therefore impacts to the side of the vehicle do not generally require deployment of the airbag. Angular impacts to the vehicle that miss the front generally become side impacts or sideswipe incidents, depending on how the vehicle rotates, neither of which generally require airbag deployment.

Figure 18:
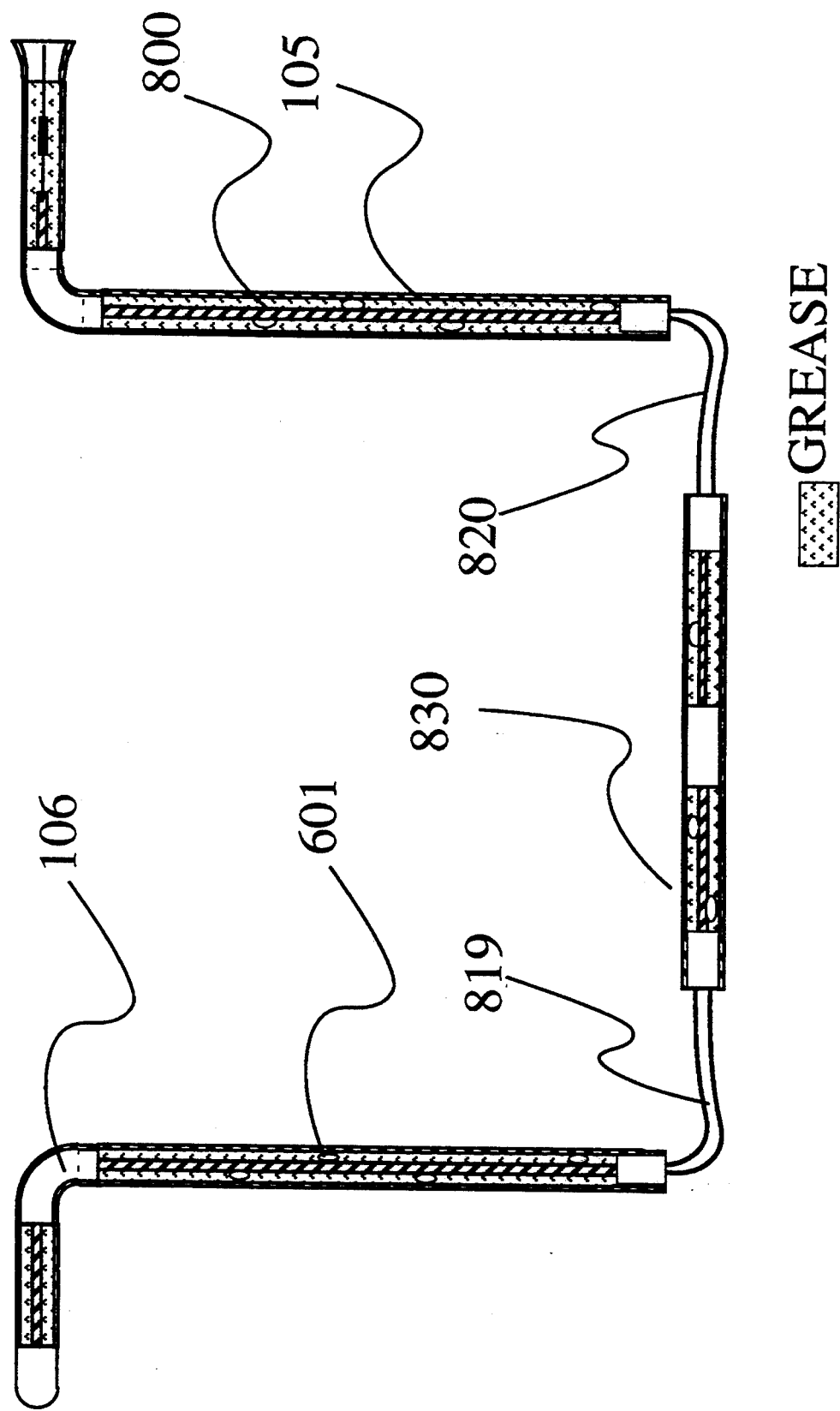
FIG. 18 is a view of three sensors making up a preferred embodiment with portions of the tube and rod cut away illustrating the use of a grease to fill the cavity between the rod and tube and illustrating how several sensors can be joined together in modular fashion.

An alternate configuration showing how several sensors of this invention can be joined together in modular fashion to form an assembly is shown in FIG. 18. Although some of the advantages which arise from having a single sensor are lost, this configuration permits the sensor to be adapted to some vehicles where it would not be possible to bend a single sensor into a desired configuration. In the manner shown, several sensors 800 and 830 can be joined by wires 819 and 820, in a daisy chain manner, such that still only a single wire, not shown, is required to join the assembly of sensors to the rest of the airbag system. Heretofore when multiple sensors are used in the crush zone, each has its own wire going to the rest of the airbag system.

A single sensor crush switch crash sensor of the rod and tube design as described herein is, therefore, sufficient to catch all airbag desired crashes. Nevertheless, electronic sensors will continue to be used in many vehicles. Some vehicle manufacturers believe that electronic sensors can catch most of the crashes and therefore desire to use the crush switch sensor design discussed herein as a supplement to the electronic sensor to catch those few crashes which are missed by the electronic sensor. In this case the crush switch sensor would be used as an input to the electronic sensor and an abbreviated version of the crush sensor might be used if only a particular class of crashes are to be sensed. In one case, for example, the manufacturer wished to use the crush switch only to catch full pole crashes and therefore desired a straight sensor which stretched across the top of the radiator.

In other cases, the crush switch sensor described herein will be used in a circuit which also contains an arming sensor but no other discriminating sensors. When both the crush switch and the arming sensor have closed, the airbag will be deployed. This would be the simplest and least expensive configuration as it would not use an electronic or other passenger compartment discriminating sensor. In other cases, as discussed in co-pending patent application Ser. No. 07/795,035 cross-referenced above, short crush switch sensors of the type described here could be used to replace the standard crush zone sensors now in use with a substantial cost saving.

Steel has been used for the materials for the rod and tube for the preferred embodiment described herein. The tube is in an annealed state to promote easy forming to the required shape and to promote deformation during the crash. The rod, on the other hand, is typically hardened so as to maintain its spring temper and promote good contact forces with the tube when the combination is bent. The outside of the sensor is coated with a protective coating to prevent it from rusting during the estimated 10 year life of the vehicle. The interior surfaces are coated with grease to prevent corrosion in those cases where the entire sensor in not filled with grease. Naturally, other materials such as aluminum, brass or even plastic with an electrically conductive surface coating could be used for the rod and tube.

The rod and tube described above have been designed to require approximately fifty to one hundred pounds of force in order to cause the sensor to trigger. This is to minimize the chance of inadvertent deployment during routine vehicle maintenance. Future generations of this crush switch design will probably be designed into the vehicle structure such as the radiator supports and thus will be made considerably smaller since this immunity to deformation during maintenance will not be required. For this case a 0.25 inch diameter tube with a 0.0625 inch diameter rod would suffice.

Once the crush switch of the present design triggers it remains latched in the conductive state for the duration of the crash. This important feature as discussed in detail in the above referenced co-pending patent applications, guarantees overlap between the triggering of the crush zone sensor and the passenger compartment mounted arming sensor.

The particular hermetic sealing technology disclosed here utilizes epoxies that are capable of creating an hermetic seal. A glass to metal seal could of course also be used to hermetically seal the sensor. In addition, other sealants could be used and other sealing methods involving, for example, compression seals of the tube over a spacer, could also be used.

The sensor described and illustrated herein utilizes a diagnostic resistor. Other systems require a complete monitoring of the sensor without the use of a diagnostic resistor. This can be accommodated in the present design by using header/connectors on both ends of the sensor. In this case, diagnostic currents could pass through both the rod and the tube independently permitting small changes in the total resistance to be diagnosed.

The tube of the sensor described herein is usually electrically grounded to the vehicle. In some applications it may be desirable not to ground the outside of the tube in which case the tube would be surrounded by an insulating plastic tube. The use of a grounded outer tube has the advantage of providing shielding from electromagnetic radiation for the rod and thus minimizing the chance of an inadvertent signal reaching the electronic sensor, for example, as the vehicle passes through strong electro-magnetic fields.

A primary advantage of the sensor described herein is its coaxial design which permits arbitrarily shaping of the sensor to adapt the sensor to a particular vehicle. There are, of course, other designs which could also be arbitrarily shaped including, but not limited to, tubes having a square, elliptical or triangular cross section. A cable placed inside a tightly wound coil spring, for example, could be designed so that it could be arbitrarily attached to the front of the vehicle and stretched across the entire front. The sensor would fire when the cable was stretched during a crash which would pull on the cable relative to the coil spring creating a differential motion at the end of the assembly. This motion could be used to close the switch. Alternately, a tube could be filled with an incompressible liquid and when the tube was bent or crushed, pressure in the liquid could be sensed at one end of the tube. Other designs will come to the minds of those skilled in the art now that the principle of sensing across the entire front of the vehicle has been disclosed.

Another key feature of this invention is that, when the sensor is properly mounted on the vehicle, plastic deformation of the tube generally occurs prior to triggering of the sensor and always occurs in a crash where the deployment of the airbag is required. As discussed above, this results in the sensor latching closed during the crash but is also prevents it from being reused on the same or another vehicle. In an alternate configuration, the dimensions of the rod and tube and the material properties are chosen so that the sensor can be caused to trigger with sufficient force without causing plastic deformation. This permits manual testing of the sensor after it is mounted on the vehicle as desired by some vehicle manufacturers. In most embodiments, the sensor can be made to trigger prior to mounting onto the vehicle by manual bending without plastic deformation. This permits the sensor to be tested after it has been manufactured but before mounting onto the vehicle.

The use of grease to dampen the motion of one or more of the parts of a crash sensor has been disclosed herein. Other crash sensor designs, and particularly crush switch sensor designs, could also make use of a grease to surround and dampen the motion of one or more of the internal parts of the sensor.

The hermetic sealing system disclosed herein has permitted the first use of an integral header/connector thus eliminating the need for the pigtail and substantially reducing the cost of airbag sensors. Naturally now that this system has been disclosed other applications of this system to other types of crash sensors will become obvious to those skilled in the art.

If two sensors of the type disclosed in this invention are mounted on a vehicle with one closer to the front than the other, then, during a crash, the forward most sensor will trigger first followed by the second more rearward sensor. If the spacing between the sensors is known, an estimate of the crash velocity can be obtained by timing the distance between switch closures. In this manner the use of two switches can be used to determine the crash velocity.

There has thus been shown and described an improved crush switch crash sensor and vehicle structure which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. A vehicle crush detecting device in combination with a vehicle, said vehicle having an engine compartment, said device comprising:
   an elongated electrically conducting tube;
   an elongated electrically conducting rod positioned within said electrically conducting tube; said rod and tube positioned in said engine compartment;
   insulating means positioned at at least two points between said rod and said tube to insulate said rod from said tube;
   said electrically conducting tube being deformed by a force greater than a predetermined magnitude which causes said tube to deflect and contact said rod in response to the crush of a vehicle.

2. A single unitary crush detecting device mounted in an engine compartment of a vehicle, said vehicle having:
   i) a front structure,
   ii) a bumper mounted on said front structure, and
   iii) a rear,
   said device being elongated,
   said device senses crashes over an area of the engine compartment of the vehicle,
   said crush detecting device comprising:
   an electrically conductive tube means which is deformable by a mechanical force greater than a predetermined magnitude, said tube means having a first part and a second part, said first part joined to said second part, said electrically conductive tube means being elongated;
   an electrically conductive rod means parallel to and inside said electrically conductive tube means, said electrically conductive rod means being engaged by said electrically conductive tube means after said electrically conductive tube means has been deformed by said mechanical force, said deformation not causing severance of said crush detecting device, to complete an electrical circuit indicating that a crush of a predetermined distance has been detected;
   means to position said first part of said tube means at a distance toward the rear of said vehicle from the front of said vehicle; and,
   means to position said second part of said electrically conductive tube means at a greater distance toward the rear from the front of said bumper than said first part.

3. In a vehicle having an engine compartment and a supporting structure comprising rails on either side of said vehicle, a single unitary elongated crash detecting device mounted in the engine compartment of said vehicle, said device comprising:
   a first electrically conductive means which is deformable by a mechanical force greater than a predetermined magnitude, said first electrically conductive means being an elongated tube, said first electrically conductive means having a first part and a second part, said first part joined to said second part;
   a second electrically conductive rod means mounted inside the tube means which is engaged by said first electrically conductive tube means after said first electrically conductive tube means has been deformed by said mechanical force to complete an electrical circuit;
   means to position said first part of said first electrically conductive tube means inside of said rails of said vehicle; and
   means to position said second part of said first electrically conductive tube means outside of said rails of said vehicle.

4. A single unitary vehicle engine compartment crush detecting device mounted in said engine compartment comprising:
   an electrically conductive means which is deformable by a mechanical force greater than a predetermined magnitude, said electrically conductive tube means having a first part and a second part;
   an electrically conductive rod means also having a first part and a second part,
   a first section comprises said first parts and a second section comprises said second parts, and
   wherein:
   said first part of said rod means is engaged by said first part of said tube means upon said first part of said tube means being deformed a first predetermined deformation amount by said predetermined magnitude of said mechanical force, to complete an electric circuit, and,
   said second part of aid rod means is engaged by said second part of said electrically conductive tube means upon said second part of said tube means being deformed by second predetermined deformation amount by said predetermined magnitude of said mechanical force, to complete and electric circuit, said second predetermined deformation amount is different from said first predetermined deformation amount, and thus said first section has a different sensitivity to crush forces than that of said second section, and
   said completion of said electric circuit indicating that a vehicle crush of a predetermined distance depending on location of said section has been detected.

5. In a motor vehicle having a front end, said front end having an engine compartment with: a right portion, a center portion and a left portion, and an occupant protection apparatus which is deployed in the event of a front end impact that crushes at least one of: said right portion to a first prescribed depth, said center portion to a second prescribed depth, and said left portion to a third prescribed depth, the improvement comprising:
   a single unitary elongated non-optical sensing means mounted in said front end of said vehicle and occupying a small volume along all three of said prescribed depths, and wherein
   upon said impact, said sensing means deforms without fracturing at any of said prescribed depths.

6. The invention of claim 1 further comprising
   an hermetical seal for said crush detecting device, said device having a connector, said connector having at least one hermetic seal comprising an epoxy and two metal members, said epoxy providing an insulating seal surrounding and between said metal members,
   the improvement comprising the addition of sufficient filler material to said epoxy to cause the thermal expansion coefficient of said epoxy to approximately match the thermal expansion coefficient of said metal members,
   wherein said filler comprises Kevlar.

7. The invention of claim 2 wherein said device has at least one bend.

8. The invention of claim 1 wherein said device has at least one bend.

9. The invention of claim 3 wherein said device has at least one bend.

* * * * *